United States Patent
Taherzadeh Boroujeni et al.

(10) Patent No.: US 12,212,515 B2
(45) Date of Patent: Jan. 28, 2025

(54) DEMODULATION REFERENCE SIGNAL BUNDLING FOR PHYSICAL UPLINK CONTROL CHANNEL REPETITIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Junyi Li, Fairless Hills, PA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 17/646,959

(22) Filed: Jan. 4, 2022

(65) Prior Publication Data
US 2022/0224475 A1    Jul. 14, 2022

Related U.S. Application Data

(60) Provisional application No. 63/137,193, filed on Jan. 14, 2021.

(51) Int. Cl.
*H04L 5/00* (2006.01)
*H04L 1/08* (2006.01)

(52) U.S. Cl.
CPC .............. *H04L 5/0048* (2013.01); *H04L 1/08* (2013.01)

(58) Field of Classification Search
CPC ....... H04L 5/0048; H04L 1/08; H04L 5/0053; H04L 5/0094; H04L 5/0051; H04L 5/00; H04L 25/0202; H04L 25/0222; H04L 25/0228; H04L 41/0681; H04L 41/08; H04L 41/0866; H04L 41/0873;
(Continued)

(56) References Cited

U.S. PATENT DOCUMENTS

2013/0176868 A1\*  7/2013  Gaal ............................ 370/252
2016/0226649 A1\*  8/2016  Papasakellariou et al. .................
                                                                  H04L 5/0057
(Continued)

FOREIGN PATENT DOCUMENTS

WO    WO 2017122959 A1 \*  7/2017  ............... H04L 5/00
WO    2020253517            12/2020

OTHER PUBLICATIONS

KR 20230069203 A) >>> New Radio Coverage Limitation Enhanced Channel Estimation (see title). (Year: 2023).\*
(Continued)

*Primary Examiner* — Meless N Zewdu
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication that demodulation reference signal (DMRS) bundling is to be used for channel estimation by the base station for one or more physical uplink control channel (PUCCH) repetitions, where the indication is a semi-static configuration or a dynamic indication. The UE may transmit, to the base station, the one or more PUCCH repetitions by maintaining a phase continuity among DMRSs of the one or more PUCCH repetitions based at least in part on receiving the indication that DMRS bundling is to be used. Numerous other aspects are described.

30 Claims, 10 Drawing Sheets

(58) Field of Classification Search
CPC .............. H04L 41/0886; H04L 5/001; H04W 72/1263; H04W 72/1268; H04W 72/1273; H04W 72/20; H04W 72/21; H04W 72/23; H04W 74/00; H04W 74/002; H04W 74/004; H04W 74/006; H04W 74/008; H04W 76/00; H04W 76/10; H04W 76/11; H04W 76/19; H04W 88/00; H04W 88/02; H04W 88/08; H04W 88/18; H04W 56/0095; H04W 56/0015; H04W 72/231; H04W 72/232; H04W 56/00; H04B 7/0413; H04B 7/0452; H04B 7/0617

See application file for complete search history.

(56) References Cited

U.S. PATENT DOCUMENTS

| | | | |
|---|---|---|---|
| 2018/0279298 A1 | 9/2018 | Wang et al. | |
| 2019/0254081 A1* | 8/2019 | Li et al. | H04W 74/0841 |
| 2019/0313436 A1* | 10/2019 | Lee et al. | H04W 72/1289 |
| 2020/0015222 A1* | 1/2020 | Huang et al. | H04W 72/04 |
| 2020/0187030 A1 | 6/2020 | Yamamoto et al. | |
| 2020/0221474 A1 | 7/2020 | Lee et al. | |
| 2021/0194556 A1* | 6/2021 | Ly et al. | H04B 7/0626 |
| 2023/0014328 A1* | 1/2023 | Sun et al. | H04W 72/0413 |
| 2023/0111395 A1* | 4/2023 | Li et al. | H04W 24/08 |
| 2023/0171777 A1* | 6/2023 | Yuan et al. | H04W 72/21 |
| 2023/0188291 A1* | 6/2023 | Xu et al. | H04L 5/0051 |

OTHER PUBLICATIONS

Lei Jing et al. (KR 20220119022 A) >>> Methods and Apparatus for Indicating and Transitioning UE Capabilities (see title) (Year: 2022).*

Guo Z., et al., "5G NR Uplink Coverage Enhancement Based on DMRS Bundling and Multi-slot Transmission", 2020 IEEE 20th International Conference on Communication Technology, 2020, pp. 482-486.

* cited by examiner

DEMODULATION REFERENCE SIGNAL BUNDLING FOR PHYSICAL UPLINK CONTROL CHANNEL REPETITIONS

CROSS-REFERENCE TO RELATED APPLICATION

This Patent Application claims priority to U.S. Provisional Patent Application No. 63/137,193, filed on Jan. 14, 2021, entitled "DMRS BUNDLING FOR PUCCH REPETITIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal (DMRS) bundling for physical uplink control channel (PUCCH) repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, an indication that demodulation reference signal (DMRS) bundling is to be used for channel estimation by the base station for one or more physical uplink control channel (PUCCH) repetitions, where the indication is a semi-static configuration or a dynamic indication; and transmitting, to the base station, the one or more PUCCH repetitions by maintaining a phase continuity among DMRSs of the one or more PUCCH repetitions based at least in part on receiving the indication that DMRS bundling is to be used.

In some aspects, a method of wireless communication performed by a base station includes transmitting, to one or more UEs, an indication that DMRS bundling is to be used for channel estimation by the base station for PUCCH repetitions, where the indication is a semi-static configuration or a dynamic indication; receiving, from a UE of the one or more UEs, one or more PUCCH repetitions; and performing a channel estimation of an uplink channel associated with the one or more PUCCH repetitions by applying DMRS bundling among DMRSs of the one or more PUCCH repetitions.

In some aspects, a UE for wireless communication includes a memory and one or more processors, coupled to the memory, configured to: receive, from a base station, an indication that DMRS bundling is to be used for channel estimation by the base station for one or more PUCCH repetitions, where the indication is a semi-static configuration or a dynamic indication; and transmit, to the base station, the one or more PUCCH repetitions by maintaining a phase continuity among DMRSs of the one or more PUCCH repetitions based at least in part on receiving the indication that DMRS bundling is to be used.

In some aspects, a base station for wireless communication includes a memory and one or more processors, coupled to the memory, configured to: transmit, to one or more UEs, an indication that DMRS bundling is to be used for channel estimation by the base station for PUCCH repetitions, where the indication is a semi-static configuration or a dynamic indication; receive, from a UE of the one or more UEs, one or more PUCCH repetitions; and perform a channel estimation of an uplink channel associated with the one or more PUCCH repetitions by applying DMRS bundling among DMRSs of the one or more PUCCH repetitions.

In some aspects, a non-transitory computer-readable medium storing a set of instructions for wireless communication includes one or more instructions that, when executed by one or more processors of a UE, cause the UE to: receive, from a base station, an indication that DMRS bundling is to be used for channel estimation by the base station for one or more PUCCH repetitions, where the indication is a semi-static configuration or a dynamic indication; and transmit, to the base station, the one or more PUCCH repetitions by maintaining a phase continuity among DMRSs of the one or more PUCCH repetitions based at least in part on receiving the indication that DMRS bundling is to be used.

In some aspects, a non-transitory computer-readable medium storing a set of instructions for wireless communication includes one or more instructions that, when executed by one or more processors of a base station, cause the base station to: transmit, to one or more UEs, an indication that DMRS bundling is to be used for channel estimation by the base station for PUCCH repetitions, where the indication is a semi-static configuration or a dynamic indication; receive, from a UE of the one or more UEs, one or more PUCCH repetitions; and perform a channel estimation of an uplink channel associated with the one or more PUCCH repetitions by applying DMRS bundling among DMRSs of the one or more PUCCH repetitions.

In some aspects, an apparatus for wireless communication includes means for receiving, from a base station, an indication that DMRS bundling is to be used for channel estimation by the base station for one or more PUCCH repetitions, where the indication is a semi-static configuration or a dynamic indication; and means for transmitting, to the base station, the one or more PUCCH repetitions by maintaining a phase continuity among DMRSs of the one or more PUCCH repetitions based at least in part on receiving the indication that DMRS bundling is to be used.

In some aspects, an apparatus for wireless communication includes means for transmitting, to one or more UEs, an indication that DMRS bundling is to be used for channel estimation by the apparatus for PUCCH repetitions, where the indication is a semi-static configuration or a dynamic indication; means for receiving, from a UE of the one or more UEs, one or more PUCCH repetitions; and means for performing a channel estimation of an uplink channel associated with the one or more PUCCH repetitions by applying DMRS bundling among DMRSs of the one or more PUCCH repetitions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
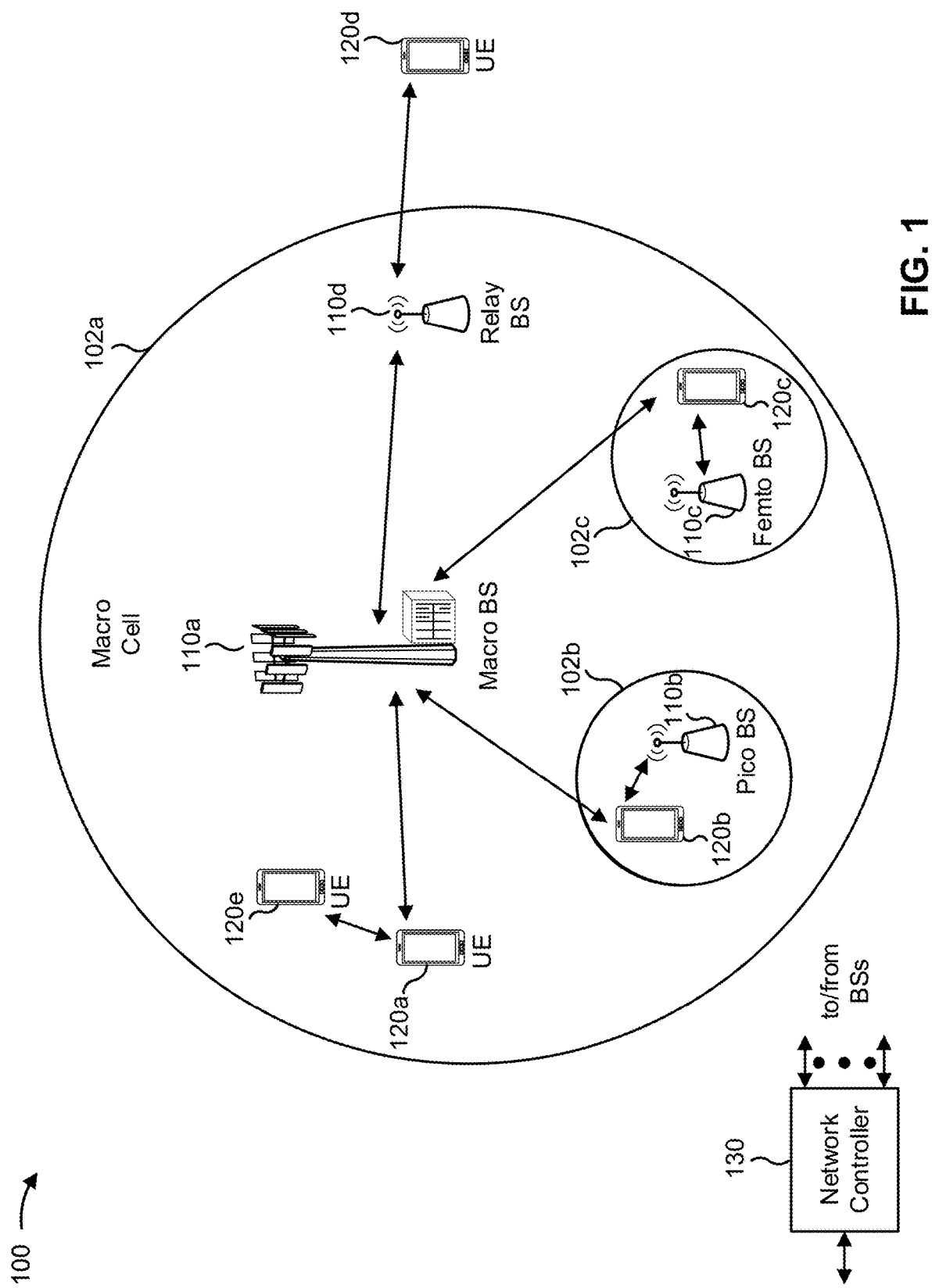
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
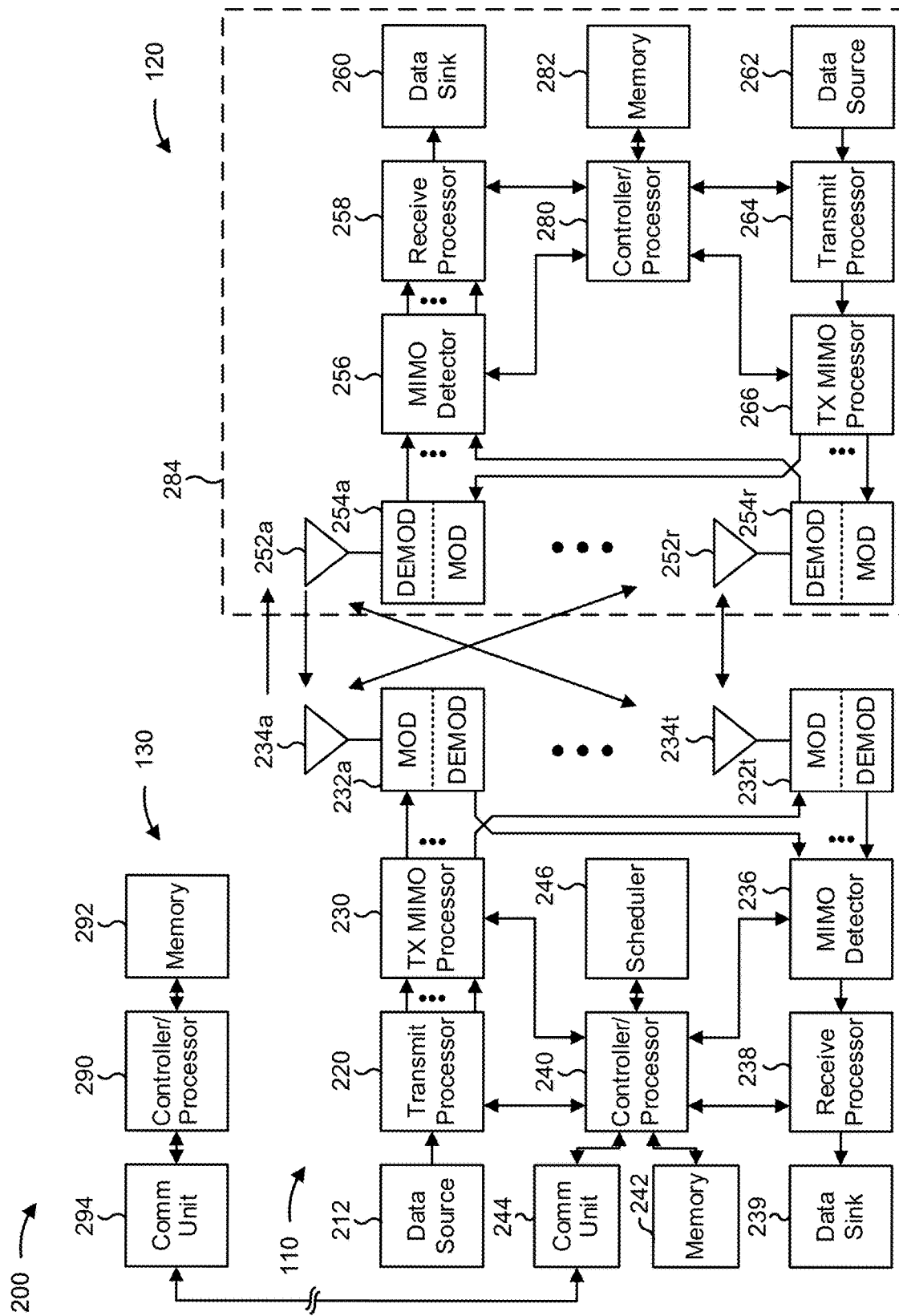
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-10).

Controller/processor 240 of base station 110, controller/processor 280 of UE 120, and/or any other component(s) of FIG. 2 may perform one or more techniques associated with demodulation reference signal (DMRS) bundling for physical uplink control channel (PUCCH) repetitions, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for receiving, from a base station, an indication that DMRS bundling is to be used for channel estimation by the base station for one or more PUCCH repetitions, wherein the indication is a semi-static configuration or a dynamic indication; and/or means for transmitting, to the base station, the one or more PUCCH repetitions by maintaining a phase continuity among DMRSs of the one or more PUCCH repetitions based at least in part on receiving the indication that DMRS bundling is to be used. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving, from the base station, the semi-static configuration indicating that DMRS bundling is to be used for channel estimation by the base station for the one or more PUCCH repetitions.

In some aspects, the UE 120 includes means for receiving the dynamic indication that is specific to the UE that indicates that DMRS bundling is to be used for channel estimation by the base station.

In some aspects, the UE 120 includes means for receiving, from the base station, a group-common dynamic indication that DMRS bundling is to be used for channel estimation by the base station for the one or more PUCCH repetitions.

In some aspects, the UE 120 includes means for receiving, from the base station, an indication of a PUCCH repetition factor for the one or more PUCCH repetitions and the indication that DMRS bundling is to be used for channel estimation by the base station for the one or more PUCCH repetitions.

In some aspects, the UE 120 includes means for transmitting, to the base station, a capability message indicating a phase continuity capability of the UE.

In some aspects, the UE 120 includes means for receiving, from the base station, an indication of a PUCCH repetition group and an indication that DMRS bundling is to be applied by the base station across DMRSs of each PUCCH repetition included in the PUCCH repetition group.

In some aspects, the UE 120 includes means for receiving an indication of a number of PUCCH repetitions to be included in each PUCCH repetition group.

In some aspects, the UE 120 includes means for receiving an indication of a threshold amount of time between consecutive PUCCH repetitions, wherein consecutive PUCCH repetitions that have a time gap between the consecutive PUCCH repetitions that satisfies the threshold amount of time are to be included in a PUCCH repetition group.

In some aspects, the UE 120 includes means for transmitting a first PUCCH repetition included in a PUCCH repetition group; means for determining that a second PUCCH repetition included in the PUCCH repetition group is not to be transmitted; and/or means for transmitting a third PUCCH repetition included in the PUCCH repetition group after determining that the second PUCCH repetition included in the PUCCH repetition group is not to be transmitted, In some aspects, the UE 120 includes means for receiving an indication that PUCCH repetitions that are to be transmitted by the UE using a same transmit beam are to be included in a PUCCH repetition group for DMRS bundling.

In some aspects, the UE 120 includes means for identifying that consecutive PUCCH repetitions that are to be transmitted by the UE using the same transmit beam are to be included in the PUCCH repetition group for DMRS bundling.

In some aspects, the UE 120 includes means for identifying that consecutive PUCCH repetitions and non-consecutive PUCCH repetitions that are to be transmitted by the UE using the same transmit beam are to be included in the PUCCH repetition group for DMRS bundling.

In some aspects, the UE 120 includes means for identifying whether non-consecutive PUCCH repetitions that are to be transmitted by the UE using the same transmit beam are to be included in the PUCCH repetition group for DMRS bundling based at least in part on a phase continuity capability of the UE.

In some aspects, the UE 120 includes means for receiving, from the base station, an indication of whether non-consecutive PUCCH repetitions that are to be transmitted by the UE using the same transmit beam are to be included in the PUCCH repetition group for DMRS bundling.

In some aspects, the UE 120 includes means for transmitting the one or more PUCCH repetitions based at least in part on applying one or more restrictions.

In some aspects, the base station 110 includes means for transmitting, to one or more UEs, an indication that DMRS bundling is to be used for channel estimation by the base station for PUCCH repetitions, where the indication is a semi-static configuration or a dynamic indication; means for receiving, from a UE of the one or more UEs, one or more PUCCH repetitions; and/or means for performing a channel estimation of an uplink channel associated with the one or more PUCCH repetitions by applying DMRS bundling among DMRSs of the one or more PUCCH repetitions. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for aggregating the DMRSs of the one or more PUCCH repetitions; and/or means for performing the channel estimation of the uplink channel based at least in part on the aggregated DMRSs of the one or more PUCCH repetitions.

In some aspects, the base station 110 includes means for transmitting, to the one or more UEs, the semi-static configuration indicating that DMRS bundling is to be used for channel estimation by the base station for PUCCH repetitions.

In some aspects, the base station 110 includes means for transmitting, to the UE of the one or more UEs, the dynamic indication that is specific to the UE.

In some aspects, the base station 110 includes means for transmitting, to the one or more UEs, a group-common dynamic indication that DMRS bundling is to be used for channel estimation by the base station for PUCCH repetitions.

In some aspects, the base station 110 includes means for transmitting, to the one or more UEs, an indication of a PUCCH repetition factor for one or more PUCCH repetitions and the indication that DMRS bundling is to be used for channel estimation by the base station for the one or more PUCCH repetitions.

In some aspects, the base station 110 includes means for receiving, from the UE of the one or more UEs, a capability message indicating a phase continuity capability of the UE.

In some aspects, the base station 110 includes means for identifying a subset of UEs, from the set of UEs, that have indicated a sufficient phase continuity capability for DMRS bundling; and/or means for performing channel estimation by applying DMRS bundling among DMRSs of PUCCH repetitions received from the subset of UEs.

In some aspects, the base station 110 includes means for transmitting, to the one or more UEs, an indication of one or more PUCCH repetition groups and an indication that DMRS bundling is to be applied by the base station across DMRSs of each PUCCH repetition included in a PUCCH repetition group.

In some aspects, the base station 110 includes means for identifying that the one or more PUCCH repetitions are included in a same PUCCH repetition group; and/or means for applying DMRS bundling among DMRSs of the one or more PUCCH repetitions for channel estimation based at least in part on identifying that the one or more PUCCH repetitions are included in the same PUCCH repetition group.

In some aspects, the base station 110 includes means for transmitting an indication of a number of PUCCH repetitions to be included in each PUCCH repetition group.

In some aspects, the base station 110 includes means for transmitting an indication of a threshold amount of time between consecutive PUCCH repetitions, wherein consecutive PUCCH repetitions that have a time gap between the consecutive PUCCH repetitions that satisfies the threshold amount of time are to be included in a PUCCH repetition group.

In some aspects, the base station 110 includes means for receiving, from the UE, a first PUCCH repetition included in a PUCCH repetition group; means for determining that a second PUCCH repetition included in the PUCCH repetition group is not transmitted by the UE; and/or means for receiving, from the UE, a third PUCCH repetition included in the PUCCH repetition group after determining that the second PUCCH repetition included in the PUCCH repetition group is not transmitted.

In some aspects, the base station 110 includes means for determining that DMRS bundling is not to be applied among DMRSs of the first PUCCH repetition and the third PUCCH repetition.

In some aspects, the base station 110 includes means for performing channel estimation by applying DMRS bundling among DMRSs of first PUCCH repetition and any PUCCH repetitions included in the PUCCH repetition group that are transmitted prior to determining that the second PUCCH repetition included in the PUCCH repetition group is not transmitted; and/or means for performing channel estimation by applying DMRS bundling among DMRSs of third PUCCH repetition and any PUCCH repetitions included in the PUCCH repetition group that are transmitted after determining that the second PUCCH repetition included in the PUCCH repetition group is not transmitted.

In some aspects, the base station 110 includes means for transmitting an indication that PUCCH repetitions that are to be transmitted by a UE using a same transmit beam are to be included in a PUCCH repetition group for DMRS bundling.

In some aspects, the base station 110 includes means for identifying whether non-consecutive PUCCH repetitions that are to be transmitted by the UE using the same transmit beam are to be included in the PUCCH repetition group for DMRS bundling.

In some aspects, the base station 110 includes means for determining whether non-consecutive PUCCH repetitions that are to be transmitted by the UE using the same transmit beam are to be included in the PUCCH repetition group based at least in part on a phase continuity capability of the UE.

In some aspects, the base station 110 includes means for transmitting, to the UE, an indication of whether non-consecutive PUCCH repetitions that are to be transmitted by the UE using the same transmit beam are to be included in the PUCCH repetition group for DMRS bundling.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
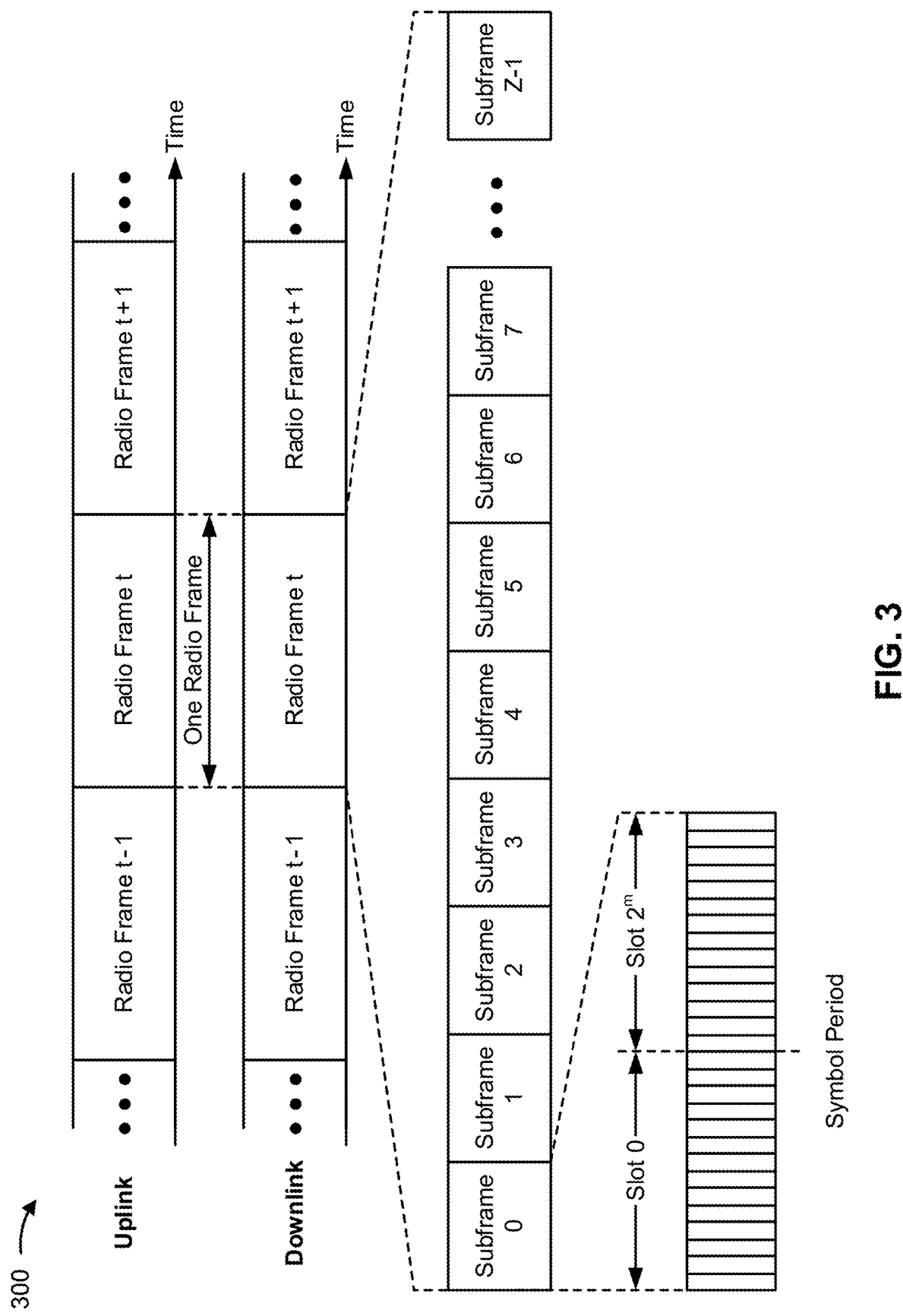
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

As indicated above, FIG. 3 is provided as an example. Other examples may differ from what is described with respect to FIG. 3.

In some cases, a transmitter, such as a UE 120 or a base station 110, may transmit one or more DMRSs to a receiver, such as another UE 120 or base station 110. A DMRS may include a reference signal that is generated from a base sequence, such as a Zadoff-Chu sequence or a Gold sequence. A DMRS may carry information used to estimate a radio channel for demodulation of an associated physical channel. The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs are used for both downlink communications and uplink communications. The receiver may perform one or more measurements of the DMRS to estimate a physical channel on which one or more communications are transmitted from the transmitter. In this way, the receiver may determine whether a channel quality of the physical channel satisfies one or more channel quality thresholds and may use the results from the one or more measurements to facilitate demodulation of the communications transmitted on the physical channel.

In some cases, the transmitter and/or receiver may support bundling of DMRSs in the time domain across one or more time slots. That is, when DMRS bundling is configured, the receiver may perform joint or aggregated channel estimation based on DMRS(s) received across multiple slots, as opposed to performing channel estimation separately for each individual slot based on the DMRS(s) received in that slot. DMRS bundling may be referred to as DMRS aggregation. DMRS bundling enables the receiver to perform joint channel estimation on the DMRS in multiple time slots to improve an accuracy of channel estimation.

For DMRS bundling to be supported, the transmitter may be required to maintain a phase continuity or phase coherence among the DMRSs transmitted by the transmitter. "Phase continuity" or "phase coherence" may refer to the transmitter maintaining a radio frequency (RF) phase after modulation among multiple transmissions (e.g., among multiple DMRSs) over time. For example, to maintain continuity or phase coherence among DMRSs, the transmitter may maintain a consistency in a phase relationship among multiple DMRSs transmitted in different time slots. Phase continuity or phase coherence among the DMRSs transmitted by the transmitter may be required for DMRS bundling to allow the receiver to aggregate or bundle the DMRSs to perform joint channel estimation based on DMRS(s) received across multiple slots. A failure to maintain phase continuity or phase coherence among the DMRSs may result in the receiver being unable to perform a channel estimation, or may result in an inaccurate channel estimation, when applying DMRS bundling.

In some cases, a UE 120 may be configured to transmit one or more PUCCH repetitions of a PUCCH communication. For example, the UE 120 may be configured to transmit multiple PUCCH repetitions across different time slots. In some aspects, a PUCCH format of a PUCCH communication may indicate a number of repetitions associated with the PUCCH communication (e.g., a repetition factor). A PUCCH repetition may include one or more DMRSs. Therefore, it may be beneficial for a base station 110 to perform DMRS bundling across DMRSs of PUCCH repetitions to improve an accuracy of a channel estimation of the uplink channel. However, the UE 120 may be unaware of which PUCCH repetitions are to be associated with DMRS bundling and/or may be unaware that the base station 110 is to apply DMRS bundling across DMRSs of multiple PUCCH repetitions. Therefore, the UE 120 may not maintain phase continuity or phase coherence across the PUCCH repetitions. Moreover, some UEs 120 may be unable to support or maintain phase continuity or phase coherence across the multiple PUCCH repetitions (e.g., due to a lack of capability of the UE 120 or an RF hardware configuration of the UE 120). As a result, a UE 120 may not maintain phase continuity or phase coherence across the multiple PUCCH repetitions, resulting in the base station 110 being unable to perform a channel estimation, or resulting in an inaccurate channel estimation, by applying DMRS bundling among DMRSs of the multiple PUCCH repetitions. This may result in decreased demodulation performance by the base station 110.

Some techniques and apparatuses described herein enable DMRS bundling for PUCCH repetitions. A base station 110 may indicate, to one or more UEs 120, that the base station 110 is to apply DMRS bundling across one or more PUCCH repetitions. For example, PUCCH repetitions may be grouped into repetition groups, enabling a UE 120 to identify that phase continuity should be maintained among DMRSs of PUCCH repetitions included in a repetition group. The UE 120 may transmit one or more PUCCH repetitions (e.g., PUCCH repetitions included in a repetition group) by maintaining a phase continuity among DMRSs of the one or more PUCCH repetitions. The base station 110 may receive the one or more PUCCH repetitions. The base station 110 may perform a channel estimation of an uplink channel associated with the one or more PUCCH repetitions by applying DMRS bundling among DMRSs of the one or more PUCCH repetitions. As a result, the UE 120 is enabled to identify PUCCH repetitions that are associated with DMRS bundling and may ensure that a phase continuity among DMRSs of the PUCCH repetitions is maintained by the UE 120. This enables the base station 110 to apply DMRS bundling among the DMRSs of the PUCCH repetitions, improving an accuracy of channel estimation by the base station 110.

Figure 4:
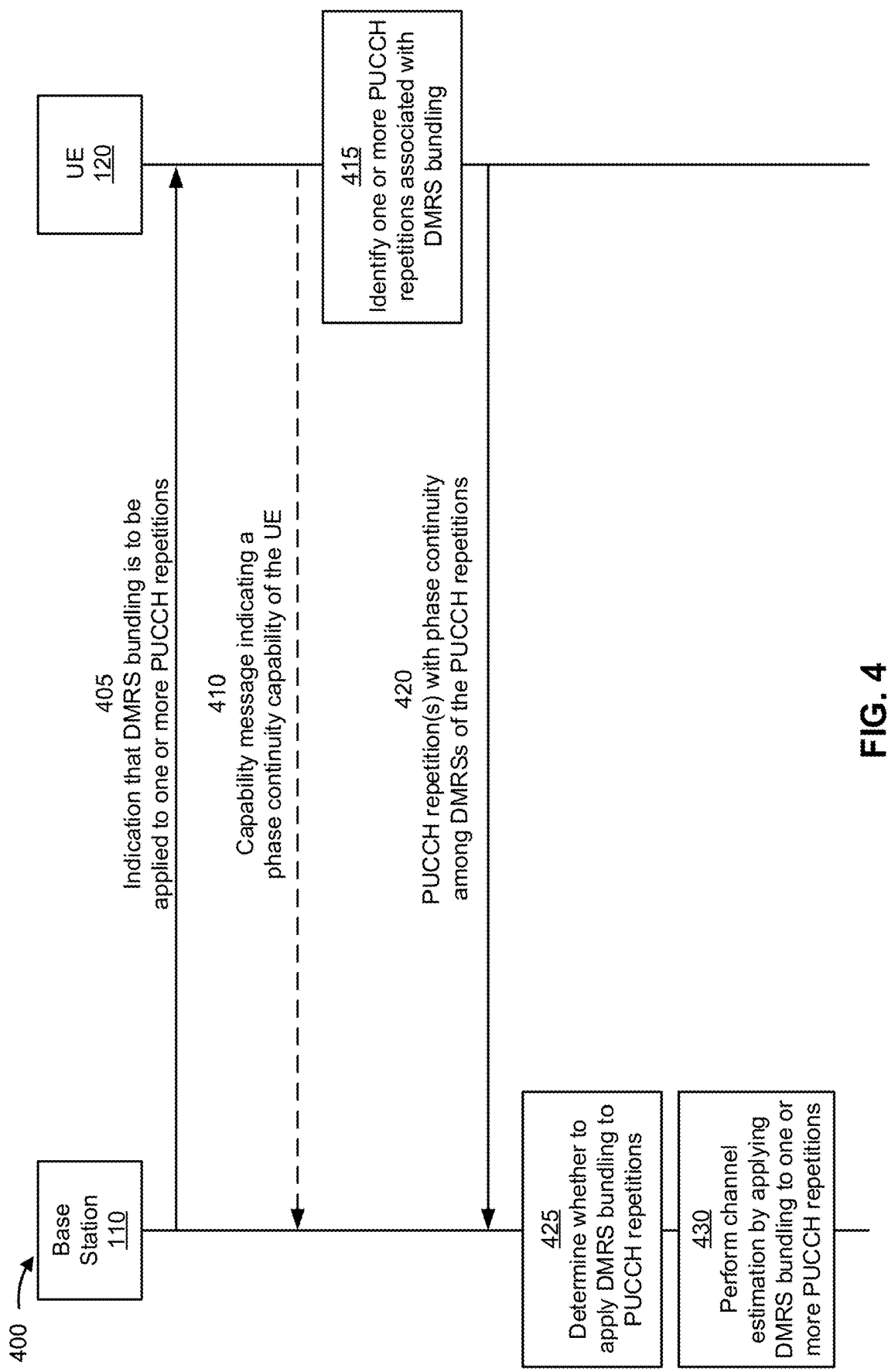
FIGS. 4-6 are diagrams illustrating examples associated with demodulation reference signal (DMRS) bundling for physical uplink control channel (PUCCH) repetitions, in accordance with the present disclosure.

FIG. 4 is a diagram illustrating an example 400 associated with DMRS bundling for PUCCH repetitions, in accordance with the present disclosure. As shown in FIG. 4, a base station 110 and a UE 120 may communicate with one another. In some aspects, the base station 110 and the UE 120 may be included in a wireless network, such as wireless network 100. The base station 110 and the UE 120 may communicate via a wireless access link, which may include an uplink and a downlink.

As shown by reference number 405, the base station 110 may transmit, and the UE 120 may receive, an indication that DMRS bundling is to be used for channel estimation by the base station 110 for PUCCH repetitions. In some aspects, the indication that DMRS bundling is to be used for channel estimation by the base station 110 for PUCCH repetitions may be an indication to the UE 120 to apply phase continuity among DMRSs of one or more PUCCH repetitions (e.g., to enable the base station 110 to apply DMRS bundling among the DMRSs of the one or more PUCCH repetitions).

In some aspects, the indication that DMRS bundling is to be used for channel estimation by the base station 110 for PUCCH repetitions may be included in a semi-static configuration transmitted by the base station 110. In some aspects, the indication that DMRS bundling is to be used for channel estimation by the base station 110 for PUCCH repetitions may be included in a dynamic indication transmitted by the base station 110.

In some aspects, the base station 110 may transmit the indication that DMRS bundling is to be used for channel estimation by the base station 110 for PUCCH repetitions to one or more UEs 120. For example, the indication may be a group-common indication that is transmitted to multiple UEs 120. In some aspects, the indication that DMRS bundling is to be used for channel estimation by the base station 110 for PUCCH repetitions may be a UE-specific indication (e.g., the indication may be transmitted to a single UE 120). In some aspects, the base station 110 may transmit the indication that DMRS bundling is to be used for channel estimation by the base station 110 for PUCCH repetitions in a downlink control information (DCI) message (e.g., a dynamic indication). In some aspects, the base station 110 may transmit the indication that DMRS bundling is to be used for channel estimation by the base station 110 for PUCCH repetitions in a medium access control (MAC) control element (MAC-CE) message (e.g., a semi-static configuration).

In some aspects, the base station 110 may transmit, to the UE 120, an indication of a PUCCH repetition factor. The PUCCH repetition factor may indicate a number of repetitions associated with the PUCCH communication. The indication of the PUCCH repetition factor may be a dynamic indication transmitted by the base station 110. In some aspects, the base station 110 may transmit the indication of the PUCCH repetition factor and the indication that DMRS bundling is to be used for channel estimation by the base station 110 for PUCCH repetitions in the same message (e.g., as part of the same dynamic indication).

As shown by reference number 410, in some aspects, the UE 120 may transmit, and the base station 110 may receive, a capability message that indicates a phase continuity capability of the UE 120. The phase continuity capability may indicate whether the UE 120 can support phase continuity across DMRSs of multiple PUCCH repetitions. In some aspects, the phase continuity capability may indicate an amount of time that the UE 120 can maintain phase continuity across multiple transmissions. In some aspects, the phase continuity capability may indicate one or more antennas of the UE 120 across which phase continuity can be maintained (e.g., the UE 120 may be capable of maintaining phase continuity among transmissions using a first antenna and a third antenna, but may not be capable of maintaining phase continuity among transmissions using the first antenna and a second antenna).

In some aspects, the phase continuity capability may indicate whether the UE 120 is capable of maintaining phase continuity among non-consecutive transmissions that use the same transmit beam or precoder. For example, the UE 120 may communicate using a beam A and a beam B. The phase continuity capability may indicate whether the UE 120 is capable of maintaining phase continuity among transmissions on beam A if the UE 120 is to transmit a communication on beam B between the transmissions on beam A. That is, if transmissions by the UE 120 have an order in the time domain of a first transmission on beam A, a second transmission on beam B, and a third transmission on beam A, then the phase continuity capability may indicate whether the UE 120 is capable of maintaining phase continuity among the first transmission and the third transmission.

In some aspects, the base station 110 may determine whether to apply DMRS bundling to PUCCH repetitions transmitted by a UE 120 based at least in part on a reported phase continuity capability of the UE 120. For example, in some aspects, the base station 110 may transmit a group-common indication, to a set of UEs 120, that DMRS bundling is to be used for channel estimation by the base station 110 for PUCCH repetitions. The base station 110 may receive, from one or more (or all) of the set of UEs 120, a phase continuity capability message. The base station 110 may identify a subset of UEs 120, from the set of UEs 120, that have indicated a sufficient phase continuity capability for DMRS bundling. The base station 110 may perform channel estimation by applying DMRS bundling among DMRSs of PUCCH repetitions received from the subset of UEs 120, as described below in more detail.

As shown by reference number 415, the UE 120 may identify one or more PUCCH repetitions that are associated with DMRS bundling. For example, the UE 120 may identify one or more PUCCH repetitions for which the UE 120 is to maintain a phase continuity for DMRSs of the PUCCH repetitions (e.g., to enable the base station 110 to apply DMRS bundling among the DMRSs of the one or more PUCCH repetitions).

In some aspects, the UE 120 may identify one or more PUCCH repetition groups. A PUCCH repetition group may be a set of PUCCH repetitions for which the UE 120 is to apply phase continuity among DMRSs of the set of PUCCH repetitions. In other words, a PUCCH repetition group may be a set of PUCCH repetitions that the base station 110 is to apply DMRS bundling to for channel estimation.

In some aspects, the base station 110 may indicate the one or more PUCCH repetition groups when indicating that DMRS bundling is to be used for channel estimation by the base station 110 for PUCCH repetitions. In some aspects, the base station 110 may indicate the one or more PUCCH repetition groups in a separate indication or configuration. In some aspects, the base station 110 may indicate, to the UE 120, one or more parameters for forming PUCCH repetition groups. For example, a parameter for forming PUCCH repetition groups may include a number of PUCCH repetitions to be included in a PUCCH repetition group. For example, the base station 110 may indicate that every N PUCCH repetitions are to be included in a PUCCH repetition group, where N is an integer. In some aspects, a parameter for forming PUCCH repetition groups may include a threshold time gap between consecutive repetitions. That is, the UE 120 may identify a time gap between consecutive PUCCH repetitions. If the time gap does not satisfy (e.g., is larger than) the threshold time gap, then the consecutive PUCCH repetitions are not to be included in the same PUCCH repetition group. For example, the base station 110 may indicate that consecutive PUCCH repetitions, that have a time gap between the PUCCH repetitions that does not satisfy (e.g., is larger than) the threshold time gap, are not to be included in the same PUCCH repetition group.

In some aspects, a parameter for forming PUCCH repetition groups may include a beam used to transmit the PUCCH repetition. For example, PUCCH repetitions may be transmitted, by the UE 120, using multiple beams or precoders. The parameter for forming PUCCH repetition groups may indicate whether non-consecutive PUCCH repetitions that are to be transmitted by the UE 120 using the same transmit beam are to be included in the same PUCCH repetition group. In some aspects, the parameter for forming PUCCH repetition groups may indicate that only consecutive PUCCH repetitions that are to be transmitted by the UE 120 using the same transmit beam are to be included in the same PUCCH repetition group. In some aspects, the parameter for forming PUCCH repetition groups may indicate that consecutive and non-consecutive PUCCH repetitions that are to be transmitted by the UE 120 using the same transmit beam are to be included in the same PUCCH repetition group.

For example, a beam pattern for PUCCH repetitions may be beam A, followed by beam B, followed by beam A, and followed by beam B. If only consecutive PUCCH repetitions that are to be transmitted by the UE 120 using the same transmit beam are to be included in the same PUCCH repetition group, then none of the PUCCH repetitions following the above pattern may be included in the same PUCCH repetition group. However, if consecutive and non-consecutive PUCCH repetitions that are to be transmitted by the UE 120 using the same transmit beam are to be included in the same PUCCH repetition group, then the PUCCH repetitions transmitted using beam A may be included in a first PUCCH repetition group and the PUCCH repetitions transmitted using beam B may be included in a second PUCCH repetition group.

In some aspects, whether non-consecutive PUCCH repetitions that are to be transmitted by the UE 120 using the same transmit beam are to be included in the same PUCCH repetition group may be based at least in part on the phase continuity capability of the UE 120. In some aspects, whether non-consecutive PUCCH repetitions that are to be transmitted by the UE 120 using the same transmit beam are to be included in the same PUCCH repetition group may be indicated by the base station 110 to the UE 120 (e.g., in a semi-static configuration or using dynamic signaling).

The UE 120 may identify PUCCH repetition groups using one or more (or all) of the parameters described above. For example, the UE 120 may identify a PUCCH repetition group (e.g., based at least in part on one or more (or all) of the parameters described above) and may determine that the UE 120 is to maintain a phase continuity or phase coherence among DMRSs of the PUCCH repetitions included in the PUCCH repetition group.

As shown by reference number 420, the UE 120 may transmit, to the base station 110, one or more PUCCH repetitions by maintaining a phase continuity among DMRSs of the one or more PUCCH repetitions (e.g., based at least in part on receiving the indication that DMRS bundling is to be used). For example, the UE 120 may determine whether the phase continuity capability of the UE 120 is sufficient for maintaining a phase continuity among DMRSs of the one or more PUCCH repetitions. The UE 120 may identify one or more PUCCH repetitions for which a phase continuity among DMRSs of the one or more PUCCH repetitions is to be maintained (e.g., based at least in part on identifying a PUCCH repetition group, as described above). The UE 120 may ensure that an RF phase of the DMRSs of the one or more PUCCH repetitions (e.g., the PUCCH repetitions included in the PUCCH repetition group) is maintained while transmitting the one or more PUCCH repetitions. For example, the UE 120 may transmit the one or more PUCCH repetitions in separate transmissions and/or in separate time slots. The UE 120 may ensure that an RF phase of the DMRSs among each transmission for the one or more PUCCH repetitions is maintained.

In some aspects, the UE 120 may apply one or more restrictions to the transmission of the one or more PUCCH repetitions based at least in part on receiving the indication that DMRS bundling is to be used. For example, the one or more restrictions may include that phase continuity is to be maintained among the one or more PUCCH repetitions. As another example, the one or more restrictions may include that the UE 120 is to refrain from transmitting another uplink communication between the one or more PUCCH repetitions (e.g., between PUCCH repetitions included in a PUCCH repetition group). In other words, based at least in part on receiving the indication that DMRS bundling is to be used, the UE 120 may refrain from transmitting another uplink communication between a first time associated with a transmission a first PUCCH repetition and a second time associated a second transmission of a second PUCCH repetition (e.g., where DMRS bundling is to be applied among the first PUCCH repetition and the second PUCCH repetition). As another example, the one or more restrictions may include that the UE 120 is to use a certain beam pattern or precoder pattern for the transmissions of the one or more PUCCH repetitions (e.g., as depicted and described in more detail in connection with FIG. 6). The one or more restrictions may ensure, or improve a likelihood, that DMRS bundling may be successfully applied by the base station 110.

As shown by reference number 425, the base station 110 may determine whether to apply DMRS bundling to PUCCH repetitions received from the UE 120. For example, the base station 110 may determine whether to apply DMRS bundling to PUCCH repetitions received from the UE 120 based at least in part on the phase continuity capability of the UE 120. The base station 110 may determine whether to apply DMRS bundling to PUCCH repetitions received from the UE 120 based at least in part on determining whether the PUCCH repetitions are included in the same PUCCH repetition group (e.g., in a similar manner as described above in connection with the UE 120 identifying the PUCCH repetition groups).

In some aspects, the UE 120 may not transmit a PUCCH repetition included in a PUCCH repetition group. For example, the UE 120 may drop (e.g., not transmit) a PUCCH repetition due to an overlap (e.g., in the time domain) with a downlink signal or a downlink symbol. In some aspects, the UE 120 may drop a PUCCH repetition due to a cancellation indication received from the base station 110. In some aspects, the UE 120 may drop a PUCCH repetition due to an overlap (e.g., in the time domain) with another uplink signal, such as a sounding reference signal (SRS). For example, the UE 120 may drop the PUCCH repetition and transmit the other uplink signal. In some other aspects, if the UE 120 determines that the PUCCH repetition overlaps (e.g., in the time domain) with another uplink signal, or that another uplink signal is to be transmitted between another PUCCH repetition and the PUCCH repetition, the UE 120 may refrain from transmitting the other uplink signal and may transmit the PUCCH repetition. The base station 110 may determine that DMRS bundling is not to be applied among DMRSs of PUCCH repetitions transmitted before the dropped repetition and DMRSs of PUCCH repetitions transmitted after the dropped repetition. The base station 110 may determine that DMRS bundling is not to be applied in this scenario as the reception of a downlink signal or transmission of another uplink signal between transmissions of PUCCH repetitions may cause the UE 120 to be unable to maintain a phase continuity among the PUCCH repetitions.

For example, a PUCCH repetition group may include three PUCCH repetitions. The UE 120 may transmit, to the base station 110, the first PUCCH repetition (e.g., the first PUCCH repetition in the time domain). The UE 120 may drop (e.g., not transmit) the second PUCCH repetition. The UE 120 may transmit, to the base station 110, the third PUCCH repetition (e.g., the third PUCCH repetition in the time domain). The base station 110 may determine that DMRS bundling is not to be applied among a DMRS of the first PUCCH repetition and a DMRS of the third PUCCH repetition.

In the example above, if the PUCCH repetition group includes additional PUCCH repetitions (e.g., before the first PUCCH repetition in the time domain or after the third PUCCH repetition in the time domain), then the base station 110 may determine that DMRS bundling is to be applied among DMRSs of PUCCH repetitions transmitted before the second PUCCH repetition is dropped or among DMRSs of PUCCH repetitions transmitted after the second PUCCH repetition is dropped.

As shown by reference number 430, the base station 110 may perform a channel estimation of an uplink channel associated with the one or more PUCCH repetitions by applying DMRS bundling among DMRSs of the one or more PUCCH repetitions. For example, the base station 110 may perform a joint channel estimation using the DMRSs of the one or more PUCCH repetitions that are transmitted across multiple time slots.

As a result, the UE 120 is enabled to identify PUCCH repetitions that are associated with DMRS bundling and may ensure that a phase continuity among DMRSs of the PUCCH repetitions is maintained by the UE 120. This enables the base station 110 to apply DMRS bundling among the DMRSs of the PUCCH repetitions, improving an accuracy of channel estimation by the base station 110.

As indicated above, FIG. 4 is provided as an example. Other examples may differ from what is described with respect to FIG. 4.

Figure 5:
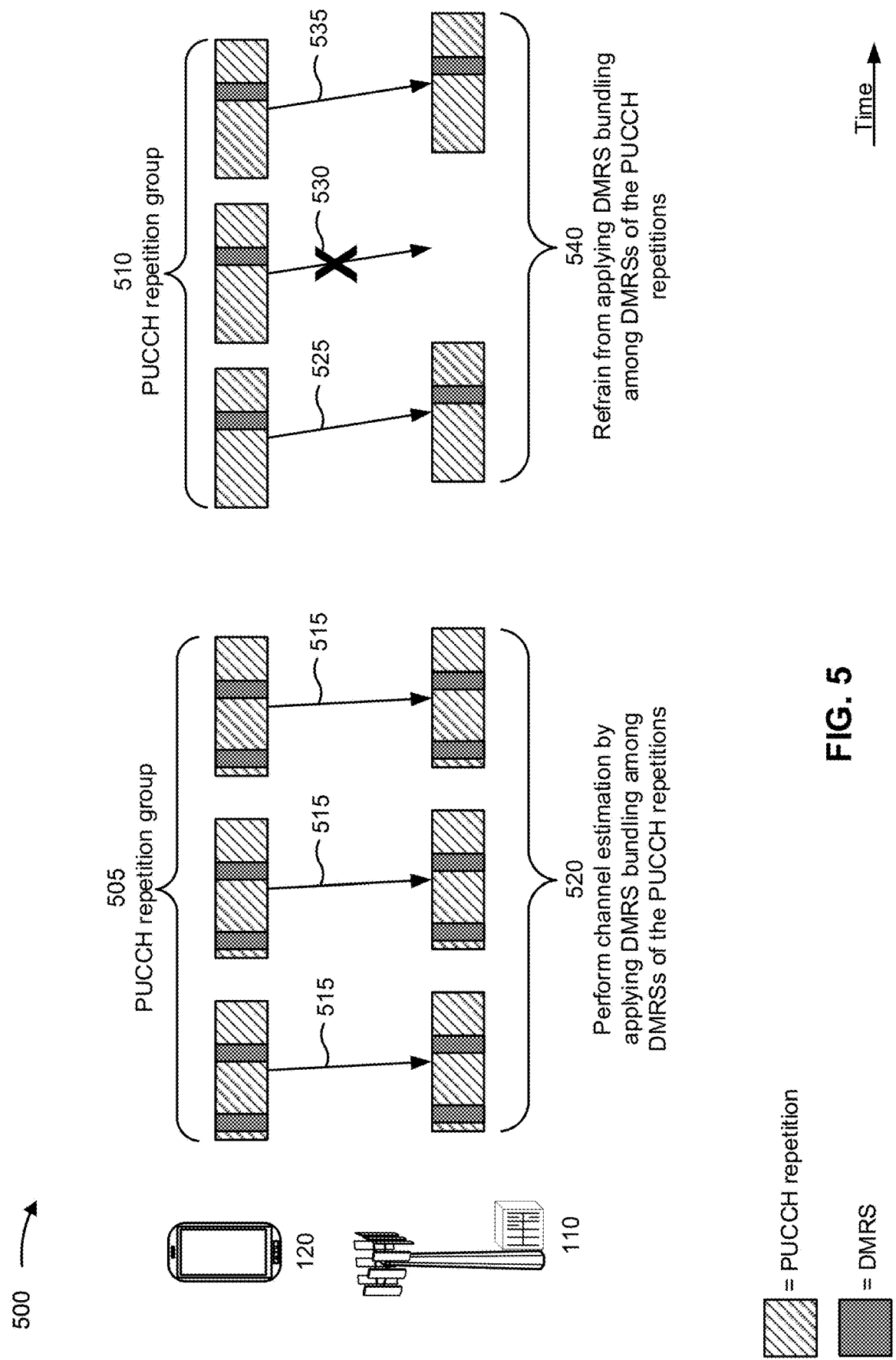

FIG. 5 is a diagram illustrating an example 500 associated with DMRS bundling for PUCCH repetitions, in accordance with the present disclosure. As shown in FIG. 5, a base station 110 and a UE 120 may communicate with one another.

As shown by reference numbers 505 and 510, the UE 120 may identify (or be scheduled or configured with) PUCCH repetition groups. As described above in connection with FIG. 4, a PUCCH repetition group may include PUCCH repetitions among which the base station 110 is to apply DMRS bundling for channel estimation. The UE 120 and/or the base station 110 may identify the PUCCH repetition groups in a similar (or the same) manner as described above in connection with FIG. 4. For example, the UE 120 and/or the base station 110 may identify the PUCCH repetition groups based at least in part on one or more (or all) of the parameters for forming PUCCH repetition groups described above in connection with FIG. 4.

As shown by reference number 515, the UE 120 may transmit each PUCCH repetition included in the PUCCH repetition group. The UE 120 may transmit the PUCCH repetitions by maintaining a phase continuity or a phase coherence among DMRSs of each PUCCH repetition included in the PUCCH repetition group. As shown by reference number 520, the base station 110 may perform a channel estimation of an uplink channel associated with the PUCCH repetitions by applying DMRS bundling among DMRSs of each PUCCH repetition included in the PUCCH repetition group.

As shown in FIG. 5, the UE 120 may attempt to transmit each PUCCH repetition included in the PUCCH repetition group shown by reference number 510. For example, the UE 120 may attempt to maintain a phase continuity or a phase coherence among DMRSs of each PUCCH repetition included in the PUCCH repetition group. As shown by reference number 525, the UE 120 may transmit, to the base station 110, a first PUCCH repetition included in the PUCCH repetition group.

As shown by reference number 530, the UE 120 may determine that a second PUCCH repetition included in the PUCCH repetition group is not to be transmitted. For example, the UE 120 may identify an overlap (e.g., in the time domain) with a downlink signal from the base station 110 or a downlink symbol. Alternatively, the UE 120 may determine that another uplink signal, such as an SRS, is to be transmitted by the UE 120 that overlaps (e.g., in the time domain) with the second PUCCH repetition. In some aspects, if the UE 120 determines that the second PUCCH repetition overlaps (e.g., in the time domain) with another uplink signal, or that another uplink signal is to be transmitted between the first PUCCH repetition and the second PUCCH repetition, the UE 120 may refrain from transmitting the other uplink signal and may transmit the second PUCCH repetition. As a result, the UE 120 may drop (e.g., not transmit) the second PUCCH repetition included in the PUCCH repetition group. As shown by reference number 535, the UE 120 may transmit, to the base station 110, a third PUCCH repetition included in the PUCCH repetition group.

As shown by reference number 540, the base station 110 may receive the first PUCCH repetition and the third PUCCH repetition from the UE 120. However, the base station 110 may refrain from applying DMRS bundling among DMRSs of the first PUCCH repetition and the third PUCCH repetition. Failing to transmit a PUCCH repetition included in the PUCCH repetition group (e.g., the second PUCCH repetition), may break the PUCCH repetition group. That is, the base station 110 may not apply DMRS bundling among DMRSs of PUCCH repetitions transmitted before the dropped PUCCH repetition (e.g., the first PUCCH repetition) and DMRSs of PUCCH repetitions transmitted after the dropped PUCCH repetition (e.g., the third PUCCH repetition).

In some cases, the PUCCH repetition group may be maintained for PUCCH repetitions transmitted before the dropped PUCCH repetition. For example, if the PUCCH repetition group included another PUCCH repetition before the first PUCCH repetition (e.g., in the time domain), then the base station 110 may perform a channel estimation of an uplink channel associated with the PUCCH repetitions by applying DMRS bundling among DMRSs of the other PUCCH repetition and the first PUCCH repetition (e.g., but not the third PUCCH repetition). Similarly, the PUCCH repetition group may be maintained for PUCCH repetitions transmitted after the dropped PUCCH repetition. For example, if the PUCCH repetition group included another PUCCH repetition after the third PUCCH repetition (e.g., in the time domain), then the base station 110 may perform a channel estimation of an uplink channel associated with the PUCCH repetitions by applying DMRS bundling among DMRSs of the other PUCCH repetition and the third PUCCH repetition (e.g., but not the first PUCCH repetition).

The base station 110 may not apply DMRS bundling in this scenario as the reception of a downlink signal or transmission of another uplink signal between transmissions of PUCCH repetitions may cause the UE 120 to be unable to maintain a phase continuity among the PUCCH repetitions. In this way, the base station 110 may ensure that DMRS bundling is applied only among DMRSs for which the UE 120 is capable of maintaining a phase continuity or phase coherence. This may improve an accuracy of a channel estimation by the base station 110 when applying DMRS bundling.

As indicated above, FIG. 5 is provided as an example. Other examples may differ from what is described with respect to FIG. 5.

Figure 6:
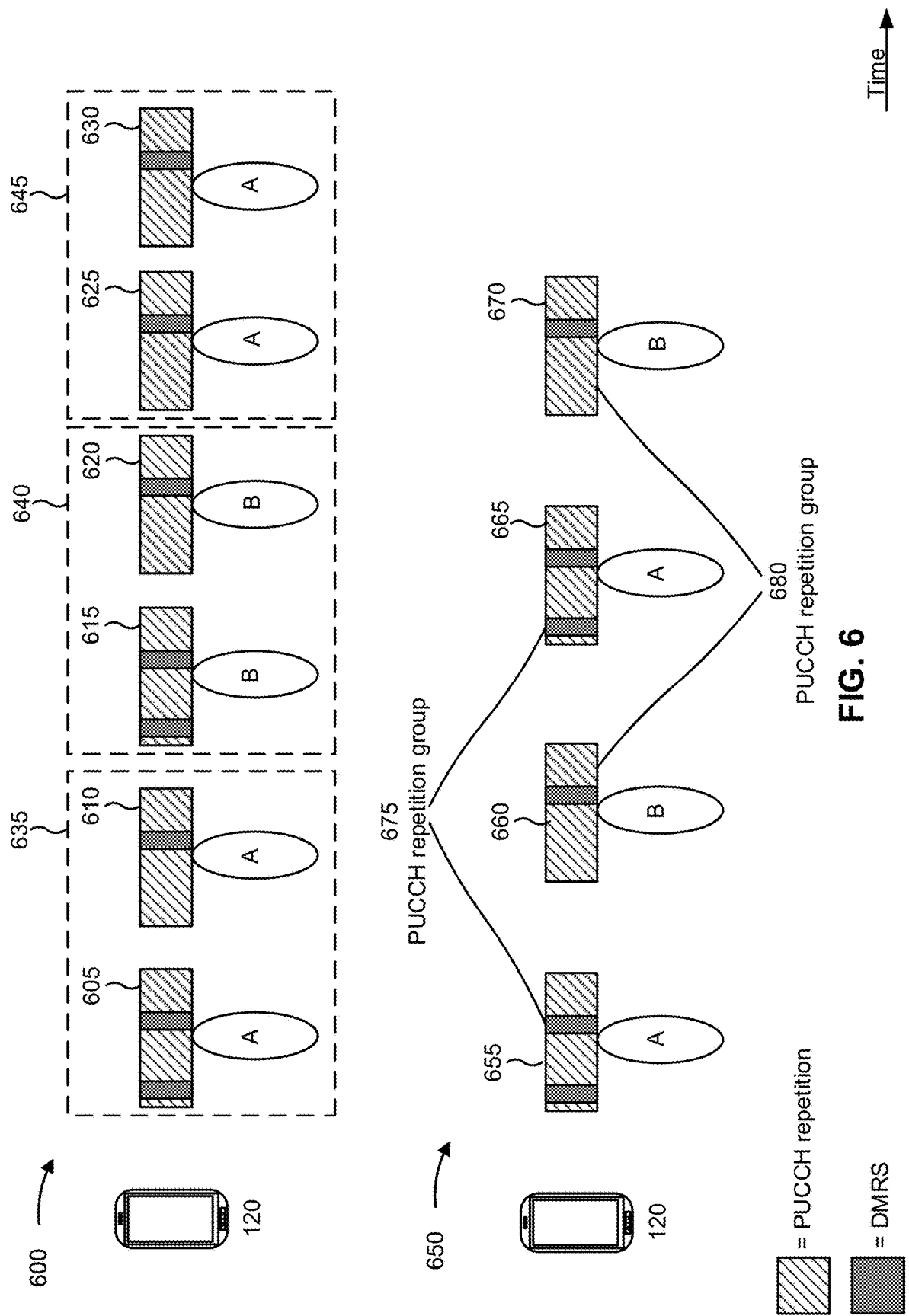

FIG. 6 is a diagram illustrating examples 600 and 650 associated with DMRS bundling for PUCCH repetitions, in accordance with the present disclosure. As shown in FIG. 6, a UE 120 may identify one or more PUCCH repetition groups based at least in part on a transmit beam or precoder used by the UE 120 to transmit PUCCH repetitions.

As shown in FIG. 6, and example 600, the UE 120 may transmit PUCCH repetitions using multiple transmit beams (e.g., shown as beam A and beam B in FIG. 6). Example 600 may depict PUCCH repetition groups formed based at least in part on a transmit beam used by the UE 120, where only consecutive PUCCH repetitions transmitted on the same transmit beam are to be included in the same PUCCH repetition group. For example, the UE 120 may transmit a PUCCH repetition 605 and a PUCCH repetition 610 on beam A, as shown in FIG. 6. The UE 120 may transmit a PUCCH repetition 615 and a PUCCH repetition 620 on beam B. The UE 120 may transmit a PUCCH repetition 625 and a PUCCH repetition 630 on beam A.

As shown by reference number 635, PUCCH repetition 605 and PUCCH repetition 610 may be included in the same PUCCH repetition group, as they are PUCCH repetitions transmitted consecutively (e.g., in the time domain) on the same transmit beam (e.g., beam A). As shown by reference number 640, PUCCH repetition 615 and PUCCH repetition 620 may be included in the same PUCCH repetition group as they are PUCCH repetitions transmitted consecutively (e.g., in the time domain) on the same transmit beam (e.g., beam B). Similarly, as shown by reference number 645, PUCCH repetition 625 and PUCCH repetition 630 may be included in the same PUCCH repetition group as they are PUCCH repetitions transmitted consecutively (e.g., in the time domain) on the same transmit beam (e.g., beam A). However, in some cases, even though PUCCH repetition 610 and PUCCH repetition 625 are transmitted on the same beam (e.g., beam A), they may not be included in the same PUCCH repetition group as they are not consecutive (e.g., PUCCH repetitions 615 and 620 are transmitted on beam B between PUCCH repetition 610 and PUCCH repetition 625). In some aspects, the UE 120 may identify the PUCCH repetition groups as described above in example 600 and based at least in part on one or more other parameters for forming PUCCH repetition groups described above in connection with FIGS. 4 and 5.

As shown in FIG. 6, and example 600, the UE 120 may transmit PUCCH repetitions using multiple transmit beams (e.g., shown as beam A and beam B in FIG. 6). Example 600 may depict PUCCH repetition groups formed based at least in part on a transmit beam used by the UE 120 where both consecutive and non-consecutive PUCCH repetitions may be included in the same PUCCH repetition group so long as the PUCCH repetitions are transmitted using the same transmit beam. For example, the UE 120 may transmit a PUCCH repetition 655 on beam A. The UE 120 may transmit a PUCCH repetition 660 on beam B. The UE 120 may transmit a PUCCH repetition 665 on beam A. The UE 120 may transmit a PUCCH repetition 670 on beam B.

As shown by reference number 675, PUCCH repetition 655 and PUCCH repetition 665 may be included in the same PUCCH repetition group because PUCCH repetition 655 and PUCCH repetition 665 are transmitted by the UE 120 using beam A. Similarly, as shown by reference number 680, PUCCH repetition 660 and PUCCH repetition 670 may be included in the same PUCCH repetition group because PUCCH repetition 660 and PUCCH repetition 670 are transmitted by the UE 120 using beam B. In some aspects, the UE 120 may identify the PUCCH repetition groups as described above in example 650 and based at least in part on one or more other parameters for forming PUCCH repetition groups described above in connection with FIGS. 4 and 5.

In some aspects, whether PUCCH repetition groups are formed in accordance with example 600 (e.g., where only consecutive PUCCH repetitions transmitted on the same transmit beam are to be included in the same PUCCH repetition group) or in accordance with example 650 (e.g., where PUCCH repetitions transmitted on the same transmit beam are to be included in the same PUCCH repetition group regardless of whether the PUCCH repetitions are consecutive) may be based at least in part on a phase continuity capability of the UE 120. In some aspects, whether PUCCH repetition groups are formed in accordance with example 600 or in accordance with example 650 may be based at least in part on an indication, to the UE 120, from a base station 110 (e.g., a dynamic indication or a semi-static configuration).

As indicated above, FIG. 6 is provided as an example. Other examples may differ from what is described with respect to FIG. 6.

Figure 7:
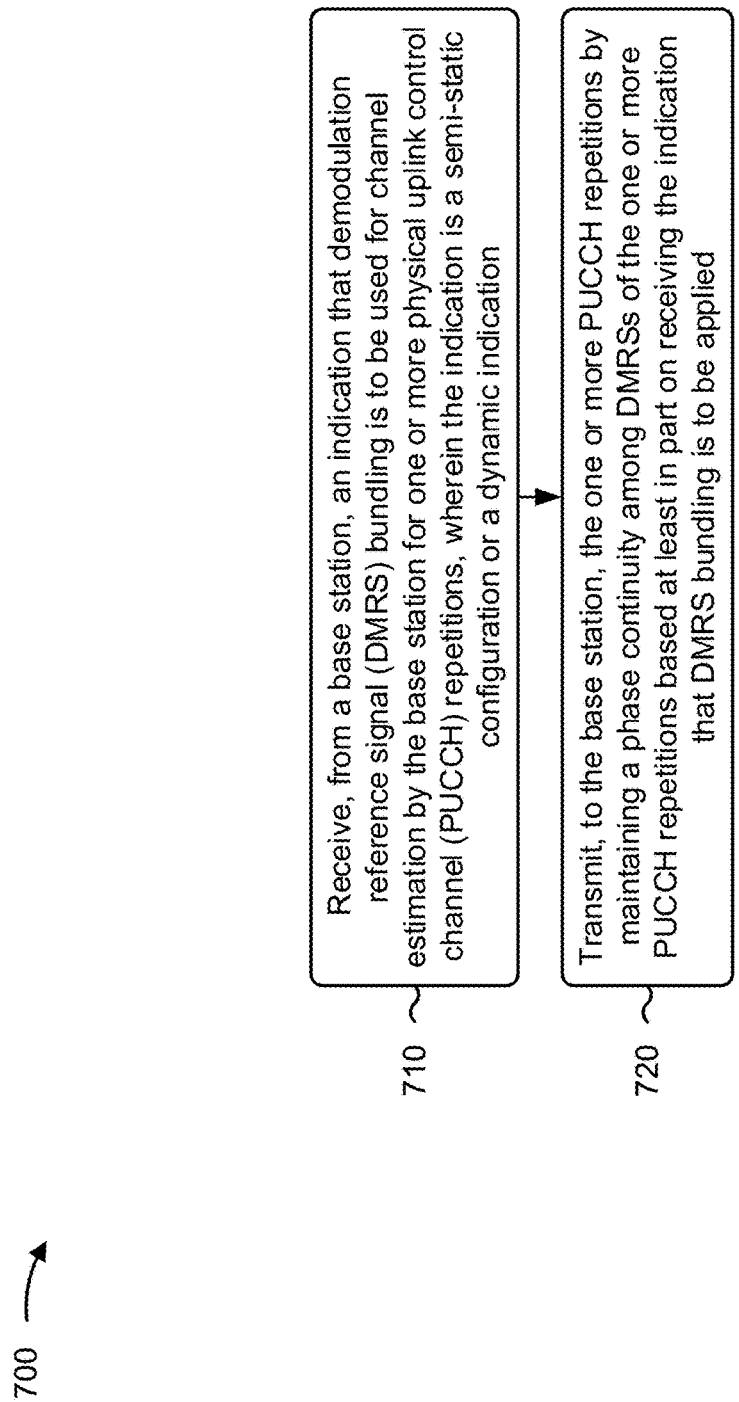
FIGS. 7 and 8 are diagrams illustrating example processes associated with DMRS bundling for PUCCH repetitions, in accordance with the present disclosure.

FIG. 7 is a diagram illustrating an example process 700 performed, for example, by a UE, in accordance with the present disclosure. Example process 700 is an example where the UE (e.g., UE 120) performs operations associated with DMRS bundling for PUCCH repetitions.

As shown in FIG. 7, in some aspects, process 700 may include receiving, from a base station, an indication that DMRS bundling is to be used for channel estimation by the base station for one or more PUCCH repetitions, wherein the indication is a semi-static configuration or a dynamic indication (block 710). For example, the UE (e.g., using reception component 902, depicted in FIG. 9) may receive, from a base station, an indication that DMRS bundling is to be used for channel estimation by the base station for one or more PUCCH repetitions, wherein the indication is a semi-static configuration or a dynamic indication, as described above.

As further shown in FIG. 7, in some aspects, process 700 may include transmitting, to the base station, the one or more PUCCH repetitions by maintaining a phase continuity among DMRSs of the one or more PUCCH repetitions based at least in part on receiving the indication that DMRS bundling is to be used (block 720). For example, the UE (e.g., using transmission component 904, depicted in FIG. 9) may transmit, to the base station, the one or more PUCCH repetitions by maintaining a phase continuity among DMRSs of the one or more PUCCH repetitions based at least in part on receiving the indication that DMRS bundling is to be used, as described above.

Process 700 may include additional aspects, such as any single aspect or any combination of aspects described below and/or in connection with one or more other processes described elsewhere herein.

In a first aspect, receiving the indication that DMRS bundling is to be used for channel estimation by the base station comprises receiving, from the base station, the semi-static configuration indicating that DMRS bundling is to be used for channel estimation by the base station for the one or more PUCCH repetitions.

In a second aspect, receiving the indication that DMRS bundling is to be used for channel estimation by the base station comprises receiving the dynamic indication, wherein the dynamic indication is specific to the UE.

In a third aspect, receiving the indication that DMRS bundling is to be used for channel estimation by the base station comprises receiving, from the base station, a group-common dynamic indication that DMRS bundling is to be used for channel estimation by the base station for the one or more PUCCH repetitions.

In a fourth aspect, alone or in combination with one or more of the first through third aspects, receiving the indication that DMRS bundling is to be used for channel estimation by the base station comprises receiving the indication via a DCI message.

In a fifth aspect, alone or in combination with one or more of the first through third aspects, receiving the indication that DMRS bundling is to be used for channel estimation by the base station comprises receiving the indication via a MAC-CE message.

In a sixth aspect, alone or in combination with one or more of the first through fifth aspects, receiving the indication that DMRS bundling is to be used for channel estimation by the base station comprises receiving, from the base station, an indication of a PUCCH repetition factor for the one or more PUCCH repetitions and the indication that DMRS bundling is to be used for channel estimation by the base station for the one or more PUCCH repetitions.

In a seventh aspect, alone or in combination with one or more of the first through sixth aspects, process 700 includes transmitting, to the base station, a capability message indicating a phase continuity capability of the UE.

In an eighth aspect, alone or in combination with one or more of the third through seventh aspects, the indication that DMRS bundling is to be used for channel estimation by the base station is a group-common indication associated with a set of UEs, that includes the UE, and the base station applies DMRS bundling to PUCCH repetitions transmitted by a subset of UEs, from the set of UEs, that have a sufficient phase continuity capability.

In a ninth aspect, alone or in combination with one or more of the first through eighth aspects, receiving the indication that DMRS bundling is to be used for channel estimation by the base station comprises receiving, from the base station, an indication of a PUCCH repetition group and an indication that DMRS bundling is to be applied by the base station across DMRSs of each PUCCH repetition included in the PUCCH repetition group.

In a tenth aspect, alone or in combination with the ninth aspect, receiving the indication of the PUCCH repetition group comprises receiving an indication of a number of PUCCH repetitions to be included in each PUCCH repetition group.

In an eleventh aspect, alone or in combination with one or more of the ninth through tenth aspects, receiving the indication of the PUCCH repetition group comprises receiving an indication of a threshold amount of time between consecutive PUCCH repetitions, wherein consecutive PUCCH repetitions that have a time gap between the consecutive PUCCH repetitions that satisfies the threshold amount of time are to be included in a PUCCH repetition group.

In a twelfth aspect, alone or in combination with one or more of the first through eleventh aspects, transmitting the one or more PUCCH repetitions comprises transmitting a first PUCCH repetition included in a PUCCH repetition group, determining that a second PUCCH repetition included in the PUCCH repetition group is not to be transmitted, and transmitting a third PUCCH repetition included in the PUCCH repetition group after determining that the second PUCCH repetition included in the PUCCH repetition group is not to be transmitted, wherein DMRS bundling is not to be applied by the base station among DMRSs of the first PUCCH repetition and the third PUCCH repetition.

In a thirteenth aspect, alone or in combination with the twelfth aspect, DMRS bundling is to be applied by the base station among DMRSs of the first PUCCH repetition and any PUCCH repetitions included in the PUCCH repetition group that are transmitted prior to determining that the second PUCCH repetition included in the PUCCH repetition group is not to be transmitted.

In a fourteenth aspect, alone or in combination with one or more of the first through thirteenth aspects, receiving the indication that DMRS bundling is to be used for channel estimation by the base station comprises receiving an indication that PUCCH repetitions that are to be transmitted by the UE using a same transmit beam are to be included in a PUCCH repetition group for DMRS bundling.

In a fifteenth aspect, alone or in combination with the fourteenth aspect, receiving the indication that PUCCH repetitions that are to be transmitted by the UE using the same transmit beam are to be included in the PUCCH repetition group for DMRS bundling comprises identifying that consecutive PUCCH repetitions that are to be transmitted by the UE using the same transmit beam are to be included in the PUCCH repetition group for DMRS bundling.

In a sixteenth aspect, alone or in combination with the fourteenth aspect, receiving the indication that PUCCH repetitions that are to be transmitted by the UE using the same transmit beam are to be included in the PUCCH repetition group for DMRS bundling comprises identifying that consecutive PUCCH repetitions and non-consecutive PUCCH repetitions that are to be transmitted by the UE using the same transmit beam are to be included in the PUCCH repetition group for DMRS bundling.

In a seventeenth aspect, alone or in combination with one or more of the fourteenth through sixteenth aspects, process 700 includes identifying whether non-consecutive PUCCH repetitions that are to be transmitted by the UE using the same transmit beam are to be included in the PUCCH repetition group for DMRS bundling based at least in part on a phase continuity capability of the UE.

In an eighteenth aspect, alone or in combination with one or more of the fourteenth through sixteenth aspects, process 700 includes receiving, from the base station, an indication of whether non-consecutive PUCCH repetitions that are to be transmitted by the UE using the same transmit beam are to be included in the PUCCH repetition group for DMRS bundling.

In a nineteenth aspect, alone or in combination with one or more of the first through eighteenth aspects, transmitting the one or more PUCCH repetitions includes applying one or more restrictions based at least in part on receiving the indication that DMRS bundling is to be used.

In a twentieth aspect, alone or in combination with the nineteenth aspect, the one or more restrictions include at least one of: refraining from transmitting another uplink signal between repetitions of the one or more PUCCH repetitions, maintaining the phase continuity among the DMRSs of the one or more PUCCH repetitions, or using a beam pattern or precoder pattern when transmitting the one or more PUCCH repetitions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
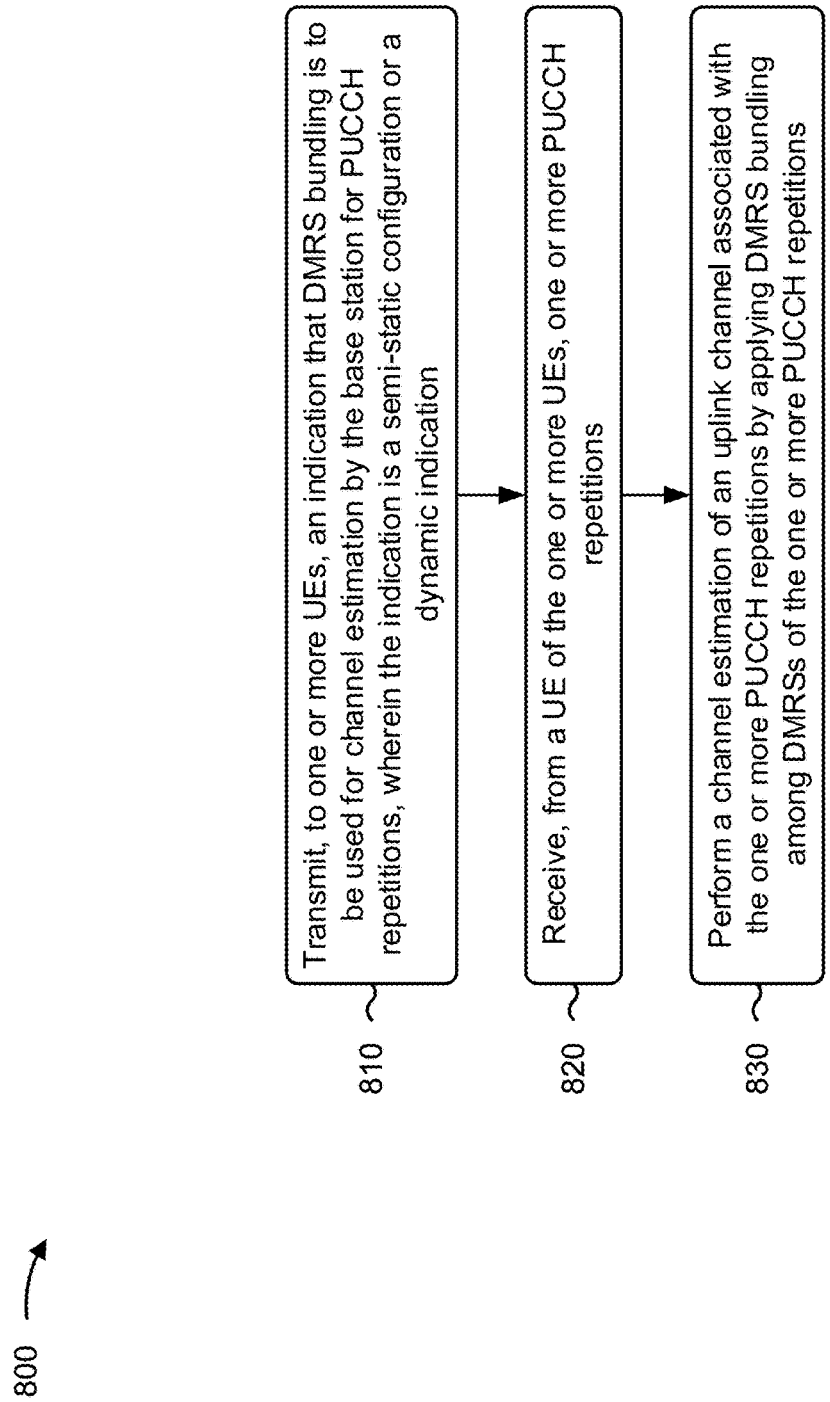

FIG. 8 is a diagram illustrating an example process 800 performed, for example, by a base station, in accordance with the present disclosure. Example process 800 is an example where the base station (e.g., base station 110) performs operations associated with DMRS bundling for PUCCH repetitions.

As shown in FIG. 8, in some aspects, process 800 may include transmitting, to one or more UEs, an indication that DMRS bundling is to be used for channel estimation by the base station for PUCCH repetitions, wherein the indication is a semi-static configuration or a dynamic indication (block 810). For example, the base station (e.g., using transmission component 1004, depicted in FIG. 10) may transmit, to one or more UEs, an indication that DMRS bundling is to be used for channel estimation by the base station for PUCCH repetitions, wherein the indication is a semi-static configuration or a dynamic indication, as described above.

As further shown in FIG. 8, in some aspects, process 800 may include receiving, from a UE of the one or more UEs, one or more PUCCH repetitions (block 820). For example, the base station (e.g., using reception component 1002, depicted in FIG. 10) may receive, from a UE of the one or more UEs, one or more PUCCH repetitions, as described above.

As further shown in FIG. 8, in some aspects, process 800 may include performing a channel estimation of an uplink channel associated with the one or more PUCCH repetitions by applying DMRS bundling among DMRSs of the one or more PUCCH repetitions (block 830). For example, the base station (e.g., using channel estimation component 1008, depicted in FIG. 10) may perform a channel estimation of an uplink channel associated with the one or more PUCCH repetitions by applying DMRS bundling among DMRSs of the one or more PUCCH repetitions, as described above.

Process 800 may include additional aspects, such as any single aspect or any combination of aspects described below and/or in connection with one or more other processes described elsewhere herein.

In a first aspect, performing the channel estimation of the uplink channel associated with the one or more PUCCH repetitions comprises aggregating the DMRSs of the one or more PUCCH repetitions, and performing the channel estimation of the uplink channel based at least in part on the aggregated DMRSs of the one or more PUCCH repetitions.

In a second aspect, alone or in combination with the first aspect, transmitting the indication that DMRS bundling is to be used for channel estimation by the base station comprises transmitting, to the one or more UEs, the semi-static configuration indicating that DMRS bundling is to be used for channel estimation by the base station for PUCCH repetitions.

In a third aspect, alone or in combination with the first aspect, transmitting the indication that DMRS bundling is to be used for channel estimation by the base station comprises transmitting, to the UE of the one or more UEs, the dynamic indication, wherein the dynamic indication is specific to the UE.

In a fourth aspect, alone or in combination with the first aspect, transmitting the indication that DMRS bundling is to be used for channel estimation by the base station comprises transmitting, to the one or more UEs, a group-common dynamic indication that DMRS bundling is to be used for channel estimation by the base station for PUCCH repetitions.

In a fifth aspect, alone or in combination with one or more of the first through fourth aspects, transmitting the indication that DMRS bundling is to be used for channel estimation by the base station comprises transmitting the indication via a DCI message.

In a sixth aspect, alone or in combination with one or more of the first through fourth aspects, transmitting the indication that DMRS bundling is to be used for channel estimation by the base station comprises transmitting the indication via a MAC-CE message.

In a seventh aspect, alone or in combination with one or more of the first through sixth aspects, transmitting the indication that DMRS bundling is to be used for channel estimation by the base station comprises transmitting, to the one or more UEs, an indication of a PUCCH repetition factor for one or more PUCCH repetitions and the indication that DMRS bundling is to be used for channel estimation by the base station for the one or more PUCCH repetitions.

In an eighth aspect, alone or in combination with one or more of the first through seventh aspects, process 800 includes receiving, from the UE of the one or more UEs, a capability message indicating a phase continuity capability of the UE.

In a ninth aspect, alone or in combination with one or more of the first and fourth through eighth aspects, the indication that DMRS bundling is to be used for channel estimation by the base station is a group-common indication associated with a set of UEs, and process 800 includes identifying a subset of UEs, from the set of UEs, that have indicated a sufficient phase continuity capability for DMRS bundling, and performing channel estimation by applying DMRS bundling among DMRSs of PUCCH repetitions received from the subset of UEs.

In a tenth aspect, alone or in combination with one or more of the first through ninth aspects, transmitting the indication that DMRS bundling is to be used for channel estimation by the base station comprises transmitting, to the one or more UEs, an indication of one or more PUCCH repetition groups and an indication that DMRS bundling is to be applied by the base station across DMRSs of each PUCCH repetition included in a PUCCH repetition group.

In an eleventh aspect, alone or in combination with the tenth aspect, performing the channel estimation of the uplink channel associated with the one or more PUCCH repetitions comprises identifying that the one or more PUCCH repetitions are included in a same PUCCH repetition group, and applying DMRS bundling among DMRSs of the one or more PUCCH repetitions for channel estimation based at least in part on identifying that the one or more PUCCH repetitions are included in the same PUCCH repetition group.

In a twelfth aspect, alone or in combination with one or more of the tenth through eleventh aspects, transmitting the indication of the one or more PUCCH repetition groups comprises transmitting an indication of a number of PUCCH repetitions to be included in each PUCCH repetition group.

In a thirteenth aspect, alone or in combination with one or more of the tenth through twelfth aspects, transmitting the indication of the one or more PUCCH repetition groups comprises transmitting an indication of a threshold amount of time between consecutive PUCCH repetitions, wherein consecutive PUCCH repetitions that have a time gap between the consecutive PUCCH repetitions that satisfies the threshold amount of time are to be included in a PUCCH repetition group.

In a fourteenth aspect, alone or in combination with one or more of the first through thirteenth aspects, receiving the one or more PUCCH repetitions comprises receiving, from the UE, a first PUCCH repetition included in a PUCCH repetition group, determining that a second PUCCH repetition included in the PUCCH repetition group is not transmitted by the UE, and receiving, from the UE, a third PUCCH repetition included in the PUCCH repetition group after determining that the second PUCCH repetition included in the PUCCH repetition group is not transmitted.

In a fifteenth aspect, alone or in combination with the fourteenth aspect, performing the channel estimation of the uplink channel associated with the one or more PUCCH repetitions comprises determining that DMRS bundling is not to be applied among DMRSs of the first PUCCH repetition and the third PUCCH repetition.

In a sixteenth aspect, alone or in combination with one or more of the fourteenth through fifteenth aspects, performing the channel estimation of the uplink channel associated with the one or more PUCCH repetitions comprises at least one of performing channel estimation by applying DMRS bundling among DMRSs of first PUCCH repetition and any PUCCH repetitions included in the PUCCH repetition group that are transmitted prior to determining that the second PUCCH repetition included in the PUCCH repetition group is not transmitted, or performing channel estimation by applying DMRS bundling among DMRSs of third PUCCH repetition and any PUCCH repetitions included in the PUCCH repetition group that are transmitted after determining that the second PUCCH repetition included in the PUCCH repetition group is not transmitted.

In a seventeenth aspect, alone or in combination with one or more of the first through sixteenth aspects, transmitting the indication that DMRS bundling is to be used for channel estimation by the base station comprises transmitting an indication that PUCCH repetitions that are to be transmitted by a UE using a same transmit beam are to be included in a PUCCH repetition group for DMRS bundling.

In an eighteenth aspect, alone or in combination with the seventeenth aspect, transmitting the indication that PUCCH repetitions that are to be transmitted by the UE using the same transmit beam are to be included in the PUCCH repetition group for DMRS bundling comprises identifying whether non-consecutive PUCCH repetitions that are to be transmitted by the UE using the same transmit beam are to be included in the PUCCH repetition group for DMRS bundling.

In a nineteenth aspect, alone or in combination with the eighteenth aspect, identifying whether non-consecutive PUCCH repetitions that are to be transmitted by the UE using the same transmit beam are to be included in the PUCCH repetition group for DMRS bundling comprises determining whether non-consecutive PUCCH repetitions that are to be transmitted by the UE using the same transmit beam are to be included in the PUCCH repetition group based at least in part on a phase continuity capability of the UE.

In a twentieth aspect, alone or in combination with the eighteenth aspect, identifying whether non-consecutive PUCCH repetitions that are to be transmitted by the UE using the same transmit beam are to be included in the PUCCH repetition group for DMRS bundling comprises transmitting, to the UE, an indication of whether non-consecutive PUCCH repetitions that are to be transmitted by the UE using the same transmit beam are to be included in the PUCCH repetition group for DMRS bundling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
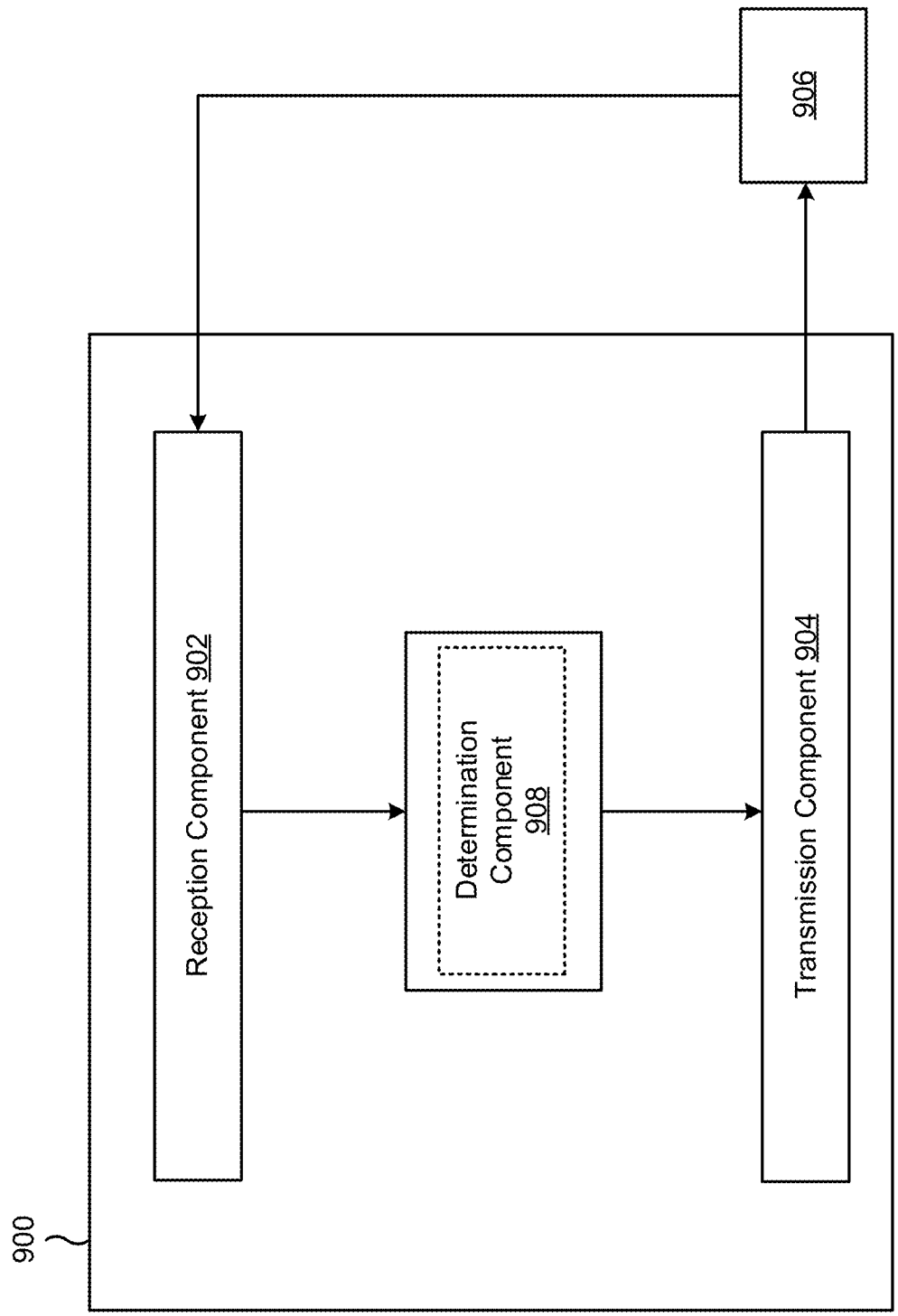
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, an indication that DMRS bundling is to be used for channel estimation by the base station for one or more PUCCH repetitions, where the indication is a semi-static configuration or a dynamic indication. The transmission component 904 may transmit, to the base station, the one or more PUCCH repetitions by maintaining a phase continuity among DMRSs of the one or more PUCCH repetitions based at least in part on receiving the indication that DMRS bundling is to be used.

The transmission component 904 may transmit, to the base station, a capability message indicating a phase continuity capability of the UE.

The determination component 908 may identify whether non-consecutive PUCCH repetitions that are to be transmitted by the UE using the same transmit beam are to be included in the PUCCH repetition group for DMRS bundling based at least in part on a phase continuity capability of the UE.

The reception component 902 may receive, from the base station, an indication of whether non-consecutive PUCCH repetitions that are to be transmitted by the UE using the same transmit beam are to be included in the PUCCH repetition group for DMRS bundling.

The transmission component 904 may apply one or more restrictions based at least in part on receiving the indication that DMRS bundling is to be used.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
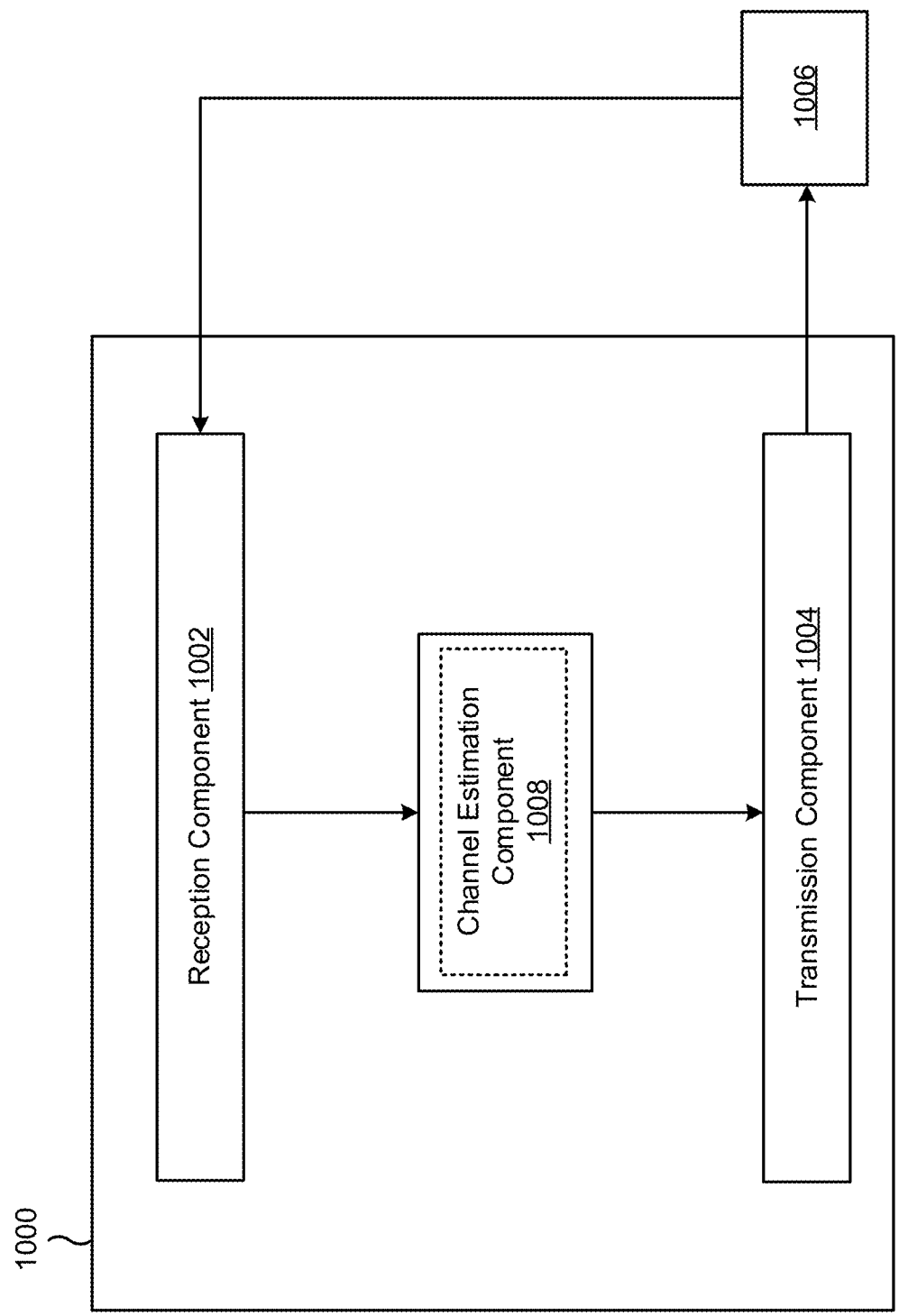

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a channel estimation component 1008, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit, to one or more UEs, an indication that DMRS bundling is to be used for channel estimation by the base station for PUCCH repetitions. The reception component 1002 may receive, from a UE of the one or more UEs, one or more PUCCH repetitions. The channel estimation component 1008 may perform a channel estimation of an uplink channel associated with the one or more PUCCH repetitions by applying DMRS bundling among DMRSs of the one or more PUCCH repetitions.

The reception component 1002 may receive, from the UE of the one or more UEs, a capability message indicating a phase continuity capability of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a user equipment (UE), comprising: receiving, from a base station, an indication that demodulation reference signal (DMRS) bundling is to be used for channel estimation by the base station for one or more physical uplink control channel (PUCCH) repetitions, wherein the indication is a semi-static configuration or a dynamic indication; and transmitting, to the base station, the one or more PUCCH repetitions by maintaining a phase continuity among DMRSs of the one or more PUCCH repetitions based at least in part on receiving the indication that DMRS bundling is to be used.

Aspect 2: The method of Aspect 1, wherein receiving the indication that DMRS bundling is to be used for channel estimation by the base station comprises: receiving, from the base station, the semi-static configuration indicating that DMRS bundling is to be used for channel estimation by the base station for the one or more PUCCH repetitions.

Aspect 3: The method of Aspect 1, wherein receiving the indication that DMRS bundling is to be used for channel estimation by the base station comprises: receiving the dynamic indication, wherein the dynamic indication is specific to the UE.

Aspect 4: The method of Aspect 1, wherein receiving the indication that DMRS bundling is to be used for channel estimation by the base station comprises: receiving, from the base station, a group-common dynamic indication that DMRS bundling is to be used for channel estimation by the base station for the one or more PUCCH repetitions.

Aspect 5: The method of any of Aspects 1 and 3-4, wherein receiving the indication that DMRS bundling is to be used for channel estimation by the base station comprises receiving the indication via a downlink control information (DCI) message.

Aspect 6: The method of any of Aspects 1 and 3-4, wherein receiving the indication that DMRS bundling is to be used for channel estimation by the base station comprises receiving the indication via a medium access control (MAC) control element (MAC-CE) message.

Aspect 7: The method of any of Aspects 1-6, wherein receiving the indication that DMRS bundling is to be used for channel estimation by the base station comprises: receiving, from the base station, an indication of a PUCCH repetition factor for the one or more PUCCH repetitions and the indication that DMRS bundling is to be used for channel estimation by the base station for the one or more PUCCH repetitions.

Aspect 8: The method of any of Aspects 1-7, further comprising: transmitting, to the base station, a capability message indicating a phase continuity capability of the UE.

Aspect 9: The method of any of Aspects 1 and 4-8, wherein the indication that DMRS bundling is to be used for channel estimation by the base station is a group-common indication associated with a set of UEs, that includes the UE, and the base station applies DMRS bundling to PUCCH repetitions transmitted by a subset of UEs, from the set of UEs, that have a sufficient phase continuity capability.

Aspect 10: The method of any of Aspects 1-9, wherein receiving the indication that DMRS bundling is to be used for channel estimation by the base station comprises: receiving, from the base station, an indication of a PUCCH repetition group and an indication that DMRS bundling is to be applied by the base station across DMRSs of each PUCCH repetition included in the PUCCH repetition group.

Aspect 11: The method of Aspect 10, wherein receiving the indication of the PUCCH repetition group comprises: receiving an indication of a number of PUCCH repetitions to be included in each PUCCH repetition group.

Aspect 12: The method of any of Aspects 10-11, wherein receiving the indication of the PUCCH repetition group comprises: receiving an indication of a threshold amount of time between consecutive PUCCH repetitions, wherein consecutive PUCCH repetitions that have a time gap between the consecutive PUCCH repetitions that satisfies the threshold amount of time are to be included in a PUCCH repetition group.

Aspect 13: The method of any of Aspects 1-12, wherein transmitting the one or more PUCCH repetitions comprises: transmitting a first PUCCH repetition included in a PUCCH repetition group; determining that a second PUCCH repetition included in the PUCCH repetition group is not to be transmitted; and transmitting a third PUCCH repetition included in the PUCCH repetition group after determining that the second PUCCH repetition included in the PUCCH repetition group is not to be transmitted, wherein DMRS bundling is not to be applied by the base station among DMRSs of the first PUCCH repetition and the third PUCCH repetition.

Aspect 14: The method of Aspect 13, wherein DMRS bundling is to be applied by the base station among DMRSs of the first PUCCH repetition and any PUCCH repetitions included in the PUCCH repetition group that are transmitted prior to determining that the second PUCCH repetition included in the PUCCH repetition group is not to be transmitted.

Aspect 15: The method of any of Aspects 1-14, wherein receiving the indication that DMRS bundling is to be used for channel estimation by the base station comprises: receiving an indication that PUCCH repetitions that are to be transmitted by the UE using a same transmit beam are to be included in a PUCCH repetition group for DMRS bundling.

Aspect 16: The method of Aspect 15, wherein receiving the indication that PUCCH repetitions that are to be transmitted by the UE using the same transmit beam are to be included in the PUCCH repetition group for DMRS bundling comprises: identifying that consecutive PUCCH repetitions that are to be transmitted by the UE using the same transmit beam are to be included in the PUCCH repetition group for DMRS bundling.

Aspect 17: The method of Aspect 15, wherein receiving the indication that PUCCH repetitions that are to be transmitted by the UE using the same transmit beam are to be included in the PUCCH repetition group for DMRS bundling comprises: identifying that consecutive PUCCH repetitions and non-consecutive PUCCH repetitions that are to be transmitted by the UE using the same transmit beam are to be included in the PUCCH repetition group for DMRS bundling.

Aspect 18: The method of any of Aspects 15-17, further comprising: identifying whether non-consecutive PUCCH repetitions that are to be transmitted by the UE using the same transmit beam are to be included in the PUCCH repetition group for DMRS bundling based at least in part on a phase continuity capability of the UE.

Aspect 19: The method of any of Aspects 15-17, further comprising: receiving, from the base station, an indication of whether non-consecutive PUCCH repetitions that are to be transmitted by the UE using the same transmit beam are to be included in the PUCCH repetition group for DMRS bundling.

Aspect 20: The method of any of Aspects 1-19, wherein transmitting the one or more PUCCH repetitions comprises applying one or more restrictions based at least in part on receiving the indication that DMRS bundling is to be used.

Aspect 21: The method of Aspect 20, wherein the one or more restrictions include at least one of: refraining from transmitting another uplink signal between repetitions of the one or more PUCCH repetitions, maintaining the phase continuity among the DMRSs of the one or more PUCCH repetitions, or using a beam pattern or precoder pattern when transmitting the one or more PUCCH repetitions.

Aspect 22: A method of wireless communication performed by a base station, comprising: transmitting, to one or more user equipment (UEs), an indication that demodulation reference signal (DMRS) bundling is to be used for channel estimation by the base station for physical uplink control channel (PUCCH) repetitions; receiving, from a UE of the one or more UEs, one or more PUCCH repetitions; and performing a channel estimation of an uplink channel associated with the one or more PUCCH repetitions by applying DMRS bundling among DMRSs of the one or more PUCCH repetitions.

Aspect 23: The method of Aspect 22, wherein performing the channel estimation of the uplink channel associated with the one or more PUCCH repetitions comprises: aggregating the DMRSs of the one or more PUCCH repetitions; and performing the channel estimation of the uplink channel based at least in part on the aggregated DMRSs of the one or more PUCCH repetitions.

Aspect 24: The method of any of Aspects 22-23, wherein transmitting the indication that DMRS bundling is to be used for channel estimation by the base station comprises: transmitting, to the one or more UEs, a semi-static configuration indicating that DMRS bundling is to be used for channel estimation by the base station for PUCCH repetitions.

Aspect 25: The method of any of Aspects 22-23, wherein transmitting the indication that DMRS bundling is to be used for channel estimation by the base station comprises: transmitting, to the UE of the one or more UEs, a dynamic indication that is specific to the UE.

Aspect 26: The method of any of Aspects 22-23, wherein transmitting the indication that DMRS bundling is to be used for channel estimation by the base station comprises: transmitting, to the one or more UEs, a group-common dynamic indication that DMRS bundling is to be used for channel estimation by the base station for PUCCH repetitions.

Aspect 27: The method of any of Aspects 22-23 and 25-26, wherein transmitting the indication that DMRS bundling is to be used for channel estimation by the base station comprises transmitting the indication via a downlink control information (DCI) message.

Aspect 28: The method of any of Aspects 22-23 and 25-26, wherein transmitting the indication that DMRS bundling is to be used for channel estimation by the base station comprises transmitting the indication via a medium access control (MAC) control element (MAC-CE) message.

Aspect 29: The method of any of Aspects 22-28, wherein transmitting the indication that DMRS bundling is to be used for channel estimation by the base station comprises: transmitting, to the one or more UEs, an indication of a PUCCH repetition factor for one or more PUCCH repetitions and the indication that DMRS bundling is to be used for channel estimation by the base station for the one or more PUCCH repetitions.

Aspect 30: The method of any of Aspects 22-29, further comprising: receiving, from the UE of the one or more UEs, a capability message indicating a phase continuity capability of the UE.

Aspect 31: The method of any of Aspects 22-23 and 26-30, wherein the indication that DMRS bundling is to be used for channel estimation by the base station is a group-common indication associated with a set of UEs, the method further comprising: identifying a subset of UEs, from the set of UEs, that have indicated a sufficient phase continuity capability for DMRS bundling; and performing channel estimation by applying DMRS bundling among DMRSs of PUCCH repetitions received from the subset of UEs.

Aspect 32: The method of any of Aspects 22-31, wherein transmitting the indication that DMRS bundling is to be used for channel estimation by the base station comprises: transmitting, to the one or more UEs, an indication of one or more PUCCH repetition groups and an indication that DMRS bundling is to be applied by the base station across DMRSs of each PUCCH repetition included in a PUCCH repetition group.

Aspect 33: The method of Aspect 32, wherein performing the channel estimation of the uplink channel associated with the one or more PUCCH repetitions comprises: identifying that the one or more PUCCH repetitions are included in a same PUCCH repetition group; and applying DMRS bundling among DMRSs of the one or more PUCCH repetitions for channel estimation based at least in part on identifying that the one or more PUCCH repetitions are included in the same PUCCH repetition group.

Aspect 34: The method of any of Aspects 32-33, wherein transmitting the indication of the one or more PUCCH repetition groups comprises: transmitting an indication of a number of PUCCH repetitions to be included in each PUCCH repetition group.

Aspect 35: The method of any of Aspects 32-34, wherein transmitting the indication of the one or more PUCCH repetition groups comprises: transmitting an indication of a threshold amount of time between consecutive PUCCH repetitions, wherein consecutive PUCCH repetitions that have a time gap between the consecutive PUCCH repetitions that satisfies the threshold amount of time are to be included in a PUCCH repetition group.

Aspect 36: The method of any of Aspects 22-35, wherein receiving the one or more PUCCH repetitions comprises: receiving, from the UE, a first PUCCH repetition included in a PUCCH repetition group; determining that a second PUCCH repetition included in the PUCCH repetition group is not transmitted by the UE; and receiving, from the UE, a third PUCCH repetition included in the PUCCH repetition group after determining that the second PUCCH repetition included in the PUCCH repetition group is not transmitted.

Aspect 37: The method of Aspect 36, wherein performing the channel estimation of the uplink channel associated with the one or more PUCCH repetitions comprises: determining that DMRS bundling is not to be applied among DMRSs of the first PUCCH repetition and the third PUCCH repetition.

Aspect 38: The method of any of Aspects 36-37, wherein performing the channel estimation of the uplink channel associated with the one or more PUCCH repetitions comprises at least one of: performing channel estimation by applying DMRS bundling among DMRSs of first PUCCH repetition and any PUCCH repetitions included in the PUCCH repetition group that are transmitted prior to determining that the second PUCCH repetition included in the PUCCH repetition group is not transmitted; or performing channel estimation by applying DMRS bundling among DMRSs of third PUCCH repetition and any PUCCH repetitions included in the PUCCH repetition group that are transmitted after determining that the second PUCCH repetition included in the PUCCH repetition group is not transmitted.

Aspect 39: The method of any of Aspects 22-38, wherein transmitting the indication that DMRS bundling is to be used for channel estimation by the base station comprises: transmitting an indication that PUCCH repetitions that are to be transmitted by a UE using a same transmit beam are to be included in a PUCCH repetition group for DMRS bundling.

Aspect 40: The method of Aspect 39, wherein transmitting the indication that PUCCH repetitions that are to be transmitted by the UE using the same transmit beam are to be included in the PUCCH repetition group for DMRS bundling comprises: identifying whether non-consecutive PUCCH repetitions that are to be transmitted by the UE using the same transmit beam are to be included in the PUCCH repetition group for DMRS bundling.

Aspect 41: The method of Aspect 40, wherein identifying whether non-consecutive PUCCH repetitions that are to be transmitted by the UE using the same transmit beam are to be included in the PUCCH repetition group for DMRS bundling comprises: determining whether non-consecutive PUCCH repetitions that are to be transmitted by the UE using the same transmit beam are to be included in the PUCCH repetition group based at least in part on a phase continuity capability of the UE.

Aspect 42: The method of Aspect 40, wherein identifying whether non-consecutive PUCCH repetitions that are to be transmitted by the UE using the same transmit beam are to be included in the PUCCH repetition group for DMRS bundling comprises: transmitting, to the UE, an indication of whether non-consecutive PUCCH repetitions that are to be transmitted by the UE using the same transmit beam are to be included in the PUCCH repetition group for DMRS bundling.

Aspect 43: An apparatus for wireless communication at a device, comprising a processor; memory coupled with the processor; and instructions stored in the memory and executable by the processor to cause the apparatus to perform the method of one or more of Aspects 1-21.

Aspect 44: A device for wireless communication, comprising a memory and one or more processors coupled to the memory, the memory and the one or more processors configured to perform the method of one or more of Aspects 1-21.

Aspect 45: An apparatus for wireless communication, comprising at least one means for performing the method of one or more of Aspects 1-21.

Aspect 46: A non-transitory computer-readable medium storing code for wireless communication, the code comprising instructions executable by a processor to perform the method of one or more of Aspects 1-21.

Aspect 47: A non-transitory computer-readable medium storing a set of instructions for wireless communication, the set of instructions comprising one or more instructions that, when executed by one or more processors of a device, cause the device to perform the method of one or more of Aspects 1-21.

Aspect 48: An apparatus for wireless communication at a device, comprising a processor; memory coupled with the processor; and instructions stored in the memory and executable by the processor to cause the apparatus to perform the method of one or more of Aspects 22-42.

Aspect 49: A device for wireless communication, comprising a memory and one or more processors coupled to the memory, the memory and the one or more processors configured to perform the method of one or more of Aspects 22-42.

Aspect 50: An apparatus for wireless communication, comprising at least one means for performing the method of one or more of Aspects 22-42.

Aspect 51: A non-transitory computer-readable medium storing code for wireless communication, the code comprising instructions executable by a processor to perform the method of one or more of Aspects 22-42.

Aspect 52: A non-transitory computer-readable medium storing a set of instructions for wireless communication, the set of instructions comprising one or more instructions that, when executed by one or more processors of a device, cause the device to perform the method of one or more of Aspects 22-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, an indication that demodulation reference signal (DMRS) bundling is to be used for channel estimation by the base station for one or more physical uplink control channel (PUCCH) repetitions, wherein the indication is a semi-static configuration or a dynamic indication; and
   transmitting, to the base station, the one or more PUCCH repetitions, using one or more beams of the UE, by maintaining a phase continuity among DMRSs of the one or more PUCCH repetitions based at least in part on receiving the indication that the DMRS bundling is to be used.

2. The method of claim 1, wherein receiving the indication that the DMRS bundling is to be used for channel estimation by the base station comprises:
   receiving, from the base station, a group-common dynamic indication that the DMRS bundling is to be used for the channel estimation by the base station for the one or more PUCCH repetitions.

3. The method of claim 1, wherein receiving the indication that the DMRS bundling is to be used for the channel estimation by the base station comprises:
   receiving, from the base station, an indication of a PUCCH repetition factor for the one or more PUCCH repetitions and the indication that the DMRS bundling is to be used for the channel estimation by the base station for the one or more PUCCH repetitions.

4. The method of claim 1, further comprising:
   transmitting, to the base station, a capability message indicating a phase continuity capability of the UE.

5. The method of claim 1, wherein receiving the indication that the DMRS bundling is to be used for the channel estimation by the base station comprises:
   receiving, from the base station, an indication of a PUCCH repetition group and an indication that the DMRS bundling is to be applied by the base station across DMRSs of each PUCCH repetition included in the PUCCH repetition group.

6. The method of claim 5, wherein receiving the indication of the PUCCH repetition group comprises:
   receiving an indication of at least one of:
      a number of PUCCH repetitions to be included in each of the PUCCH repetition group;
      or a threshold amount of time between consecutive PUCCH repetitions, wherein consecutive PUCCH repetitions that have a time gap between the consecutive PUCCH repetitions that satisfies the threshold amount of time are to be included in a PUCCH repetition group.

7. The method of claim 1, wherein transmitting the one or more PUCCH repetitions comprises:
   transmitting a first PUCCH repetition included in a PUCCH repetition group;
   determining that a second PUCCH repetition included in the PUCCH repetition group is not to be transmitted; and
   transmitting a third PUCCH repetition included in the PUCCH repetition group after determining that the second PUCCH repetition included in the PUCCH repetition group is not to be transmitted, wherein the DMRS bundling is not to be applied by the base station among DMRSs of the first PUCCH repetition and the third PUCCH repetition.

8. The method of claim 7, wherein the DMRS bundling is to be applied by the base station among the DMRSs of the first PUCCH repetition and any PUCCH repetitions included in the PUCCH repetition group that are transmitted prior to determining that the second PUCCH repetition included in the PUCCH repetition group is not to be transmitted.

9. The method of claim 1, wherein receiving the indication that the DMRS bundling is to be used for the channel estimation by the base station comprises:
receiving an indication that PUCCH repetitions that are to be transmitted by the UE using a same transmit beam are to be included in a PUCCH repetition group for the DMRS bundling.

10. The method of claim 9, wherein receiving the indication that the PUCCH repetitions that are to be transmitted by the UE using the same transmit beam are to be included in the PUCCH repetition group for the DMRS bundling comprises:
identifying that consecutive PUCCH repetitions, or consecutive PUCCH repetitions and non-consecutive PUCCH repetitions, that are to be transmitted by the UE using the same transmit beam are to be included in the PUCCH repetition group for the DMRS bundling.

11. The method of claim 9, further comprising:
receiving, from the base station, an indication of whether non-consecutive PUCCH repetitions that are to be transmitted by the UE using the same transmit beam are to be included in the PUCCH repetition group for the DMRS bundling.

12. The method of claim 1, wherein transmitting the one or more PUCCH repetitions comprises applying one or more restrictions based at least in part on receiving the semi-static configuration.

13. The method of claim 12, wherein the one or more restrictions include at least one of: refraining from transmitting another uplink signal between repetitions of the one or more PUCCH repetitions, maintaining the phase continuity among the DMRSs of the one or more PUCCH repetitions, or using a beam pattern or precoder pattern when transmitting the one or more PUCCH repetitions.

14. A user equipment (UE) for wireless communication, comprising:
a memory; and
one or more processors, coupled to the memory, configured to:
receive, from a base station, an indication that demodulation reference signal (DMRS) bundling is to be used for channel estimation by the base station for one or more physical uplink control channel (PUCCH) repetitions, wherein the indication is a semi-static configuration or a dynamic indication; and
transmit, to the base station, the one or more PUCCH repetitions, using one or more beams of the UE, by maintaining a phase continuity among DMRSs of the one or more PUCCH repetitions based at least in part on receiving the indication that the DMRS bundling is to be used.

15. The UE of claim 14, wherein the one or more processors, to receive the indication that the DMRS bundling is to be used for the channel estimation by the base station, are configured to:
receive, from the base station, a group-common dynamic indication that the DMRS bundling is to be used for the channel estimation by the base station for the one or more PUCCH repetitions.

16. The UE of claim 14, wherein the one or more processors, to receive the indication that the DMRS bundling is to be used for the channel estimation by the base station, are configured to:
receive, from the base station, an indication of a PUCCH repetition factor for the one or more PUCCH repetitions and the indication that the DMRS bundling is to be used for the channel estimation by the base station for the one or more PUCCH repetitions.

17. The UE of claim 14, wherein the one or more processors are further configured to:
transmit, to the base station, a capability message indicating a phase continuity capability of the UE.

18. The UE of claim 14, wherein the one or more processors, to receive the indication that the DMRS bundling is to be used for the channel estimation by the base station, are configured to:
receive, from the base station, an indication of a PUCCH repetition group and an indication that the DMRS bundling is to be applied by the base station across DMRSs of each PUCCH repetition included in the PUCCH repetition group.

19. The UE of claim 18, wherein the one or more processors, to receive the indication of the PUCCH repetition group, are configured to:
receive an indication of at least one of:
a number of PUCCH repetitions to be included in each PUCCH repetition group; or
a threshold amount of time between consecutive PUCCH repetitions, wherein consecutive PUCCH repetitions that have a time gap between the consecutive PUCCH repetitions that satisfies the threshold amount of time are to be included in the PUCCH repetition group.

20. The UE of claim 14, wherein the one or more processors, to transmit the one or more PUCCH repetitions, are configured to:
transmit a first PUCCH repetition included in a PUCCH repetition group;
determine that a second PUCCH repetition included in the PUCCH repetition group is not to be transmitted; and
transmit a third PUCCH repetition included in the PUCCH repetition group after determining that the second PUCCH repetition included in the PUCCH repetition group is not to be transmitted, wherein the DMRS bundling is not to be applied by the base station among DMRSs of the first PUCCH repetition and the third PUCCH repetition.

21. The UE of claim 20, wherein the DMRS bundling is to be applied by the base station among the DMRSs of the first PUCCH repetition and any PUCCH repetitions included in the PUCCH repetition group that are transmitted prior to determining that the second PUCCH repetition included in the PUCCH repetition group is not to be transmitted.

22. The UE of claim 14, wherein the one or more processors, to receive the indication that the DMRS bundling is to be used for the channel estimation by the base station, are configured to:
receive an indication that PUCCH repetitions that are to be transmitted by the UE using a same transmit beam are to be included in a PUCCH repetition group for the DMRS bundling.

23. The UE of claim 22, wherein the one or more processors, to receive the indication that the PUCCH repetitions that are to be transmitted by the UE using the same transmit beam are to be included in the PUCCH repetition group for the DMRS bundling, are configured to:
identify that consecutive PUCCH repetitions, or consecutive PUCCH repetitions and non-consecutive PUCCH repetitions, that are to be transmitted by the UE using the same transmit beam are to be included in the PUCCH repetition group for the DMRS bundling.

24. The UE of claim 22, wherein the one or more processors are further configured to:

receive, from the base station, an indication of whether non-consecutive PUCCH repetitions that are to be transmitted by the UE using the same transmit beam are to be included in the PUCCH repetition group for the DMRS bundling.

25. The UE of claim 14, wherein the one or more processors, to transmit the one or more PUCCH repetitions, are configured to apply one or more restrictions based at least in part on receiving the semi-static configuration.

26. The UE of claim 25, wherein the one or more restrictions include at least one of:
refraining from transmitting another uplink signal between repetitions of the one or more PUCCH repetitions, maintaining the phase continuity among the DMRSs of the one or more PUCCH repetitions, or using a beam pattern or precoder pattern when transmitting the one or more PUCCH repetitions.

27. A non-transitory computer-readable medium storing a set of instructions for wireless communication, the set of instructions comprising:
one or more instructions that, when executed by one or more processors of a user equipment (UE), cause the UE to:
receive, from a base station, an indication that demodulation reference signal (DMRS) bundling is to be used for channel estimation by the base station for one or more physical uplink control channel (PUCCH) repetitions, wherein the indication is a semi-static configuration or a dynamic indication; and
transmit, to the base station, the one or more PUCCH repetitions, using one or more beams of the UE, by maintaining a phase continuity among DMRSs of the one or more PUCCH repetitions based at least in part on receiving the indication that the DMRS bundling is to be used.

28. The non-transitory computer-readable medium of claim 27, wherein the one or more instructions, that cause the UE to receive the indication that the DMRS bundling is to be used for channel estimation by the base station, cause the UE to:
receive, from the base station, an indication of a PUCCH repetition group and an indication that the DMRS bundling is to be applied by the base station across DMRSs of each PUCCH repetition included in the PUCCH repetition group.

29. An apparatus for wireless communication, comprising:
means for receiving, from a base station, an indication that demodulation reference signal (DMRS) bundling is to be used for channel estimation by the base station for one or more physical uplink control channel (PUCCH) repetitions, wherein the indication is a semi-static configuration or a dynamic indication; and
means for transmitting, to the base station, the one or more PUCCH repetitions, using one or more beams of the apparatus, by maintaining a phase continuity among DMRSs of the one or more PUCCH repetitions based at least in part on receiving the indication that the DMRS bundling is to be used.

30. The apparatus of claim 29, wherein the means for receiving the indication that the DMRS bundling is to be used for channel estimation by the base station comprises:
means for receiving, from the base station, an indication of a PUCCH repetition factor for the one or more PUCCH repetitions and the indication that the DMRS bundling is to be used for channel estimation by the base station for the one or more PUCCH repetitions.

* * * * *